(12) United States Patent
Nakano et al.

(10) Patent No.: US 9,350,541 B2
(45) Date of Patent: May 24, 2016

(54) COMMUNICATION APPARATUS, COMMUNICATION METHOD, COMMUNICATION SYSTEM, AND COMPUTER PROGRAM

(75) Inventors: Takehiko Nakano, Kanagawa (JP); Hisato Shima, Tokyo (JP)

(73) Assignee: SONY CORPORATION, Tokyo (JP)

( * ) Notice: Subject to any disclaimer, the term of this patent is extended or adjusted under 35 U.S.C. 154(b) by 226 days.

(21) Appl. No.: 14/131,116

(22) PCT Filed: Jul. 3, 2012

(86) PCT No.: PCT/JP2012/066955
§ 371 (c)(1),
(2), (4) Date: Jan. 6, 2014

(87) PCT Pub. No.: WO2013/011830
PCT Pub. Date: Jan. 24, 2013

(65) Prior Publication Data
US 2014/0208113 A1    Jul. 24, 2014

(30) Foreign Application Priority Data
Jul. 15, 2011  (JP) .................. 2011-157127

(51) Int. Cl.
*H04L 9/08* (2006.01)
*H04L 29/06* (2006.01)
*H04L 9/32* (2006.01)
*H04L 12/841* (2013.01)

(52) U.S. Cl.
CPC ............... *H04L 9/0838* (2013.01); *H04L 9/32* (2013.01); *H04L 63/06* (2013.01); *H04L 63/08* (2013.01); *H04L 47/283* (2013.01)

(58) Field of Classification Search
CPC combination set(s) only.
See application file for complete search history.

(56) References Cited

U.S. PATENT DOCUMENTS

| 7,565,537 | B2 * | 7/2009 | Morais | H04L 9/083 380/251 |
| 7,653,713 | B2 * | 1/2010 | Han | H04L 12/66 709/223 |
| 8,918,889 | B2 * | 12/2014 | Shima | G06F 21/10 726/11 |
| 2005/0259824 | A1 * | 11/2005 | Isozaki | H04L 63/061 380/255 |
| 2010/0067393 | A1 | 3/2010 | Sakimura et al. | |

FOREIGN PATENT DOCUMENTS

| JP | 2006-270248 A | 10/2006 |
| JP | 2007-36351 A | 2/2007 |
| JP | 2009-296601 A | 12/2009 |
| JP | 2011-61478 A | 3/2011 |
| WO | WO 2008/090980 A1 | 7/2008 |

OTHER PUBLICATIONS

International Search Report issued Sep. 11, 2012 in PCT/JP2012/066955.

* cited by examiner

*Primary Examiner* — Beemnet Dada
(74) *Attorney, Agent, or Firm* — Hazuki International, LLC

(57) ABSTRACT

A measurement to obtain an RTT to a receiving apparatus is performed by a relay apparatus that is disposed between a WAN and a home network and connects these two networks. That an RTT value is equal to or less than the threshold value is set as a content distribution condition from a transmitting apparatus, so that the same use environment as a system using current DLNA and DTCP-IP can be realized for content use in the home network. Thereby, unjust distribution of content is prevented while an authentication and key exchange procedure performed via an external network is allowed.

15 Claims, 11 Drawing Sheets

COMMUNICATION SYSTEM 100

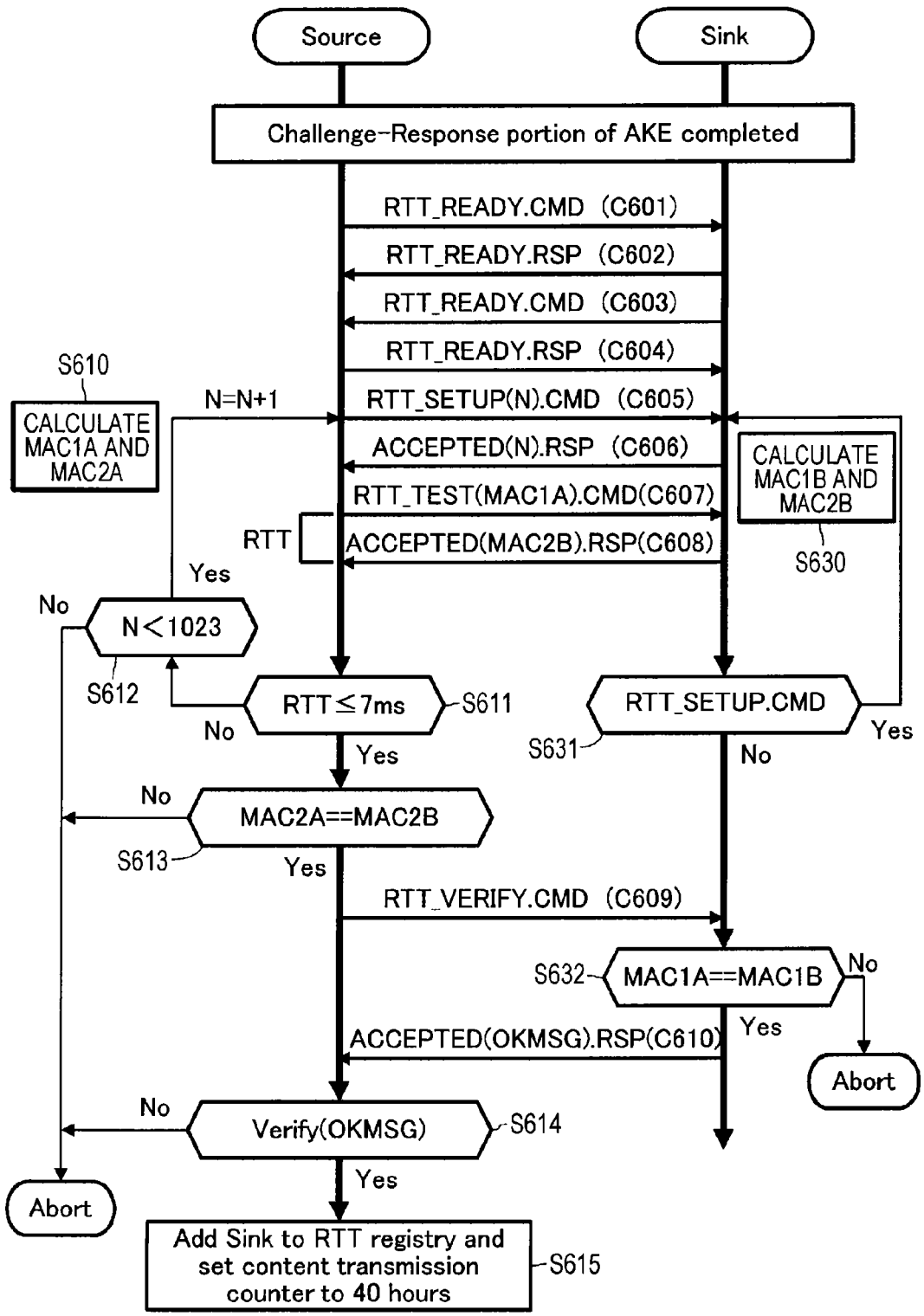

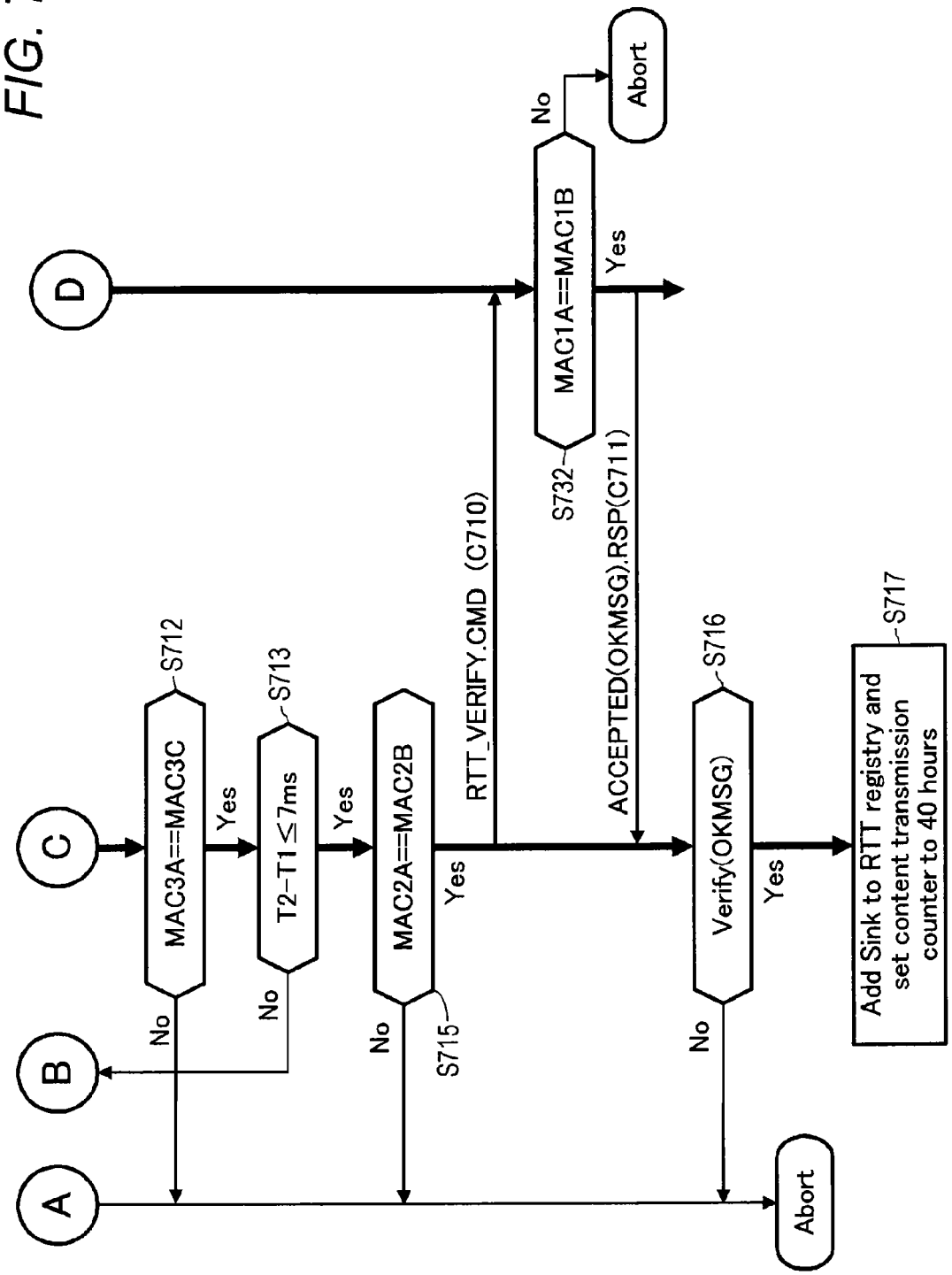

COMMUNICATION APPARATUS, COMMUNICATION METHOD, COMMUNICATION SYSTEM, AND COMPUTER PROGRAM

TECHNICAL FIELD

The technique disclosed in the present specification relates to a communication apparatus, a communication method, a communication system, and a computer program that enable a decryption key of encrypted content to be exchanged according to a predetermined authentication and key exchange (AKE) algorithm to transmit the encrypted content, thereby preventing unjust distribution of content, and more particularly, to a communication apparatus, a communication method, a communication system, and a computer program that enable content to be securely transmitted through remote access performed via an external network such as a WAN while surpassing a limit of a round trip time (RTT).

BACKGROUND ART

An unjust manipulation such as copying or falsification is relatively easy for digitized content. In particular, in remote access, a mechanism for preventing unjust use of content, which may be generated in content transmission, that is, protecting copyright while allowing personal or home use of the content is necessary. As industry-wide standard technology regarding transmission protection of digital content, DTCP (Digital Transmission Content Protection) developed by DTLA (Digital Transmission Licensing Administrator) is exemplified.

In the DTCP, an authentication protocol between apparatuses for content transmission and a transmission protocol of encrypted content are specified. In summary, the specification defines that a DTCP-compliant apparatus should not send compressed content easy to handle to outside the apparatus in an unencrypted state, that key exchange necessary for decryption of encrypted content should be carried out according to a predetermined authentication and key exchange (AKE) algorithm, and that a range of apparatuses which perform key exchange using AKE commands should be limited. A server (Source) to be a content provision source and a client (Sink) to be a content provision destination share a key through an authentication procedure by sending and receiving AKE commands. The server and the client use the key to encrypt a transmission path to perform content transmission. Therefore, an unjust client cannot obtain an encryption key unless the unjust client succeeds in the authentication with the server and thus, the unjust client cannot enjoy the content.

Initially, the DTCP defines transmission of content on a home network using a transmission path such as IEEE 1394. Recently, as typified by DLNA (Digital Living Network Alliance), there has been an increasing trend toward distributing digitized AV content through an IP network in the home. Accordingly, with intent to distribute digital content through the IP network in the home, development of DTCP technology corresponding to the IP network, that is, DTCP-IP (DTCP mapping to IP) is in progress.

The DTCP-IP that is similar to the DTCP technology is technology in which the DTCP technology is applied to the IP network. The DTCP-IP uses an IP network as a transmission path and uses a protocol for content transmission implemented on the IP network such as HTTP (Hyper Text Transfer Protocol) or RTP (Real-Time Transfer Protocol), for transmission of encrypted content. For example, when content is transmitted according to a procedure of the HTTP, the Source becomes an HTTP server and the Sink becomes an HTTP client. TCP/IP connection for the HTTP is generated and download transmission of encrypted content is performed (however, when upload transmission is performed, the Source becomes the HTTP client and the Sink becomes the HTTP server).

The IP network has been already laid broadly. In addition, it is expected that a receiving apparatus and a reproducing apparatus corresponding to the DTCP spread in the future. Therefore, it is thought that the DTCP-IP is applied to content transmission on a wide-area network such as a WAN (Wide Area Network) as well as a home network, so that unjust distribution of content can be prevented. For example, content can be securely transmitted from a server outside the home to an apparatus corresponding to the DTCP such as a television receiver in the home. Also, it is possible to have access to content protected by copyright in a server of a home network in the home, from a remote place outside the home.

However, the current DTCP-IP (DTCP Volume 1 Specification Supplement E Revision 1.31) is intended for securing only the home use of content mainly. For this reason, in order to suppress a range to perform an authentication and key exchange procedure to a home, a round trip time (RTT) is limited to a maximum of 7 milliseconds for an AKE command and an upper limit of the number of hops (TTL: Time To Live) of an IP router is set to 3.

For example, a method of accurately measuring the round trip time in the DTCP-IP has been suggested (for example, refer to Patent Documents 1 and 2). In addition, an information communication system in which, if a maximum value of a TTL value is more than 3, an authentication procedure is terminated without executing a process of a final step has been suggested (for example, refer to Patent Document 3).

As described above, if the RTT is limited for the AKE command as in the related art, when a server in the home performs an RTT check for a receiving apparatus in the home or when the server in the home performs the RTT check for a receiving apparatus in a remote place outside the home, a threshold value cannot be satisfied. As a result, the receiving apparatus cannot receive content. Meanwhile, if the threshold value of the RTT is set to a large value, unjust distribution of the content may be generated.

CITATION LIST

Patent Documents

Patent Document 1: JP 2006-270248 A
Patent Document 2: JP 2009-296601 A
Patent Document 3: JP 2007-36351 A

SUMMARY OF THE INVENTION

Problems to be Solved by the Invention

An object of the technique disclosed in the present specification is to provide a communication apparatus, a communication method, a communication system, and a computer program to be superior that enable a decryption key of encrypted content to be exchanged according to a predetermined authentication and key exchange algorithm to transmit the encrypted content, thereby preventing unjust distribution of content securely.

Another object of the technique disclosed in the present specification is to provide a communication apparatus, a communication method, a communication system, and a computer program to be superior that can prevent unjust distribution of content securely, while allowing an authentication and key exchange procedure performed via an external network such as a WAN while surpassing a limit of a round trip time.

Solution to Problem

The present application has been made in view of the above problems. According to certain embodiments, there is provided a communication apparatus including a data accumulating unit that accumulates transmission data, a communication unit that performs communication with a receiving apparatus becoming a transmission destination of data and a relay apparatus performing relay with the receiving apparatus, a first round trip time information acquiring unit that acquires first round trip time information regarding a first round trip time $RTT_L$ between the relay apparatus and the receiving apparatus, an authentication and key exchanging unit that performs authentication and key exchange with the receiving apparatus through the relay apparatus, under a condition of the key exchange where the first round trip time $RTT_L$ is equal to or less than a first threshold value, and a data transmitting unit that transmits data encrypted using a key exchanged by the authentication and key exchanging unit to the receiving apparatus.

According to certain embodiments, the first round trip time information acquiring unit configured to acquire information of the first round trip time $RTT_L$ from the relay apparatus.

According to certain embodiments, first round trip time information includes transmission timing T1 at which the relay apparatus has transmitted a command for round trip time measurement transmitted from the communication apparatus to the receiving apparatus and reception timing T2 at which the relay apparatus has received a response thereof from the receiving apparatus. In addition, the authentication and key exchanging unit is configured to perform the authentication and key exchange with the receiving apparatus through the relay apparatus, under a condition of the key exchange where the first round trip time $RTT_L$ (=T2−T1) based on a difference of the received transmission timing and reception timing is equal to or less than the first threshold value.

According to certain embodiments, the first round trip time information is the first round trip time $RTT_L$ (=T2−T1) based on a difference of transmission timing T1 at which the relay apparatus has transmitted a command for round trip time measurement transmitted from the communication apparatus to the receiving apparatus and reception timing T2 at which the relay apparatus has received a response thereof. In addition, the authentication and key exchanging unit is configured to perform the authentication and key exchange with the receiving apparatus through the relay apparatus, under a condition of the key exchange where the received round trip time $RTT_L$ is equal to or less than the first threshold value.

According to certain embodiments, the first round trip time information acquiring unit is configured to receive information for falsification prevention from the relay apparatus. The authentication and key exchanging unit is configured to detect falsification of the first round trip time information on the basis of the information for the falsification prevention and set non-falsification as a condition of the key exchange.

According to certain embodiments, further includes a measuring unit that measures a second round trip time $RTT_W$ until a response from the receiving apparatus is received through the relay apparatus after the command for the round trip time measurement is transmitted. In addition, the authentication and key exchanging unit is configured to set a result obtained by subtracting the first round trip time $RTT_L$ from the second round trip time $RTT_W$ being equal to or less than a second threshold value as the condition of the key exchange.

According to certain embodiments, and the relay apparatus are connected by a WAN and the relay apparatus and the receiving apparatus are connected by a LAN.

According to certain embodiments, the second threshold value is a value that is determined on the basis of a distance of a channel connecting the communication apparatus and the relay apparatus.

According to certain embodiments, there is provided a communication apparatus including a first communication unit that performs communication with a transmitting apparatus becoming a transmission origin of data by a first network, a second communication unit that performs communication with a receiving apparatus becoming a transmission destination of data by a second network, and a round trip time information acquiring unit that acquires round trip time information regarding a round trip time $RTT_L$ with the receiving apparatus on the second network and transmits the round trip time information to the transmitting apparatus.

According to certain embodiments, the round trip time information acquiring unit is configured to acquire transmission timing T1 at which a command for round trip time measurement transmitted from the transmitting apparatus has been transmitted to the receiving apparatus and reception timing T2 at which a response thereof has been received from the receiving apparatus as the round trip time information and transmit the transmission timing and the reception timing to the transmitting apparatus.

According to certain embodiments, the round trip time information acquiring unit of the communication apparatus according to certain embodiments are configured to acquire the round trip time $RTT_L$ (=T2−T1) based on a difference of transmission timing T1 at which a command for round trip time measurement transmitted from the transmitting apparatus has been transmitted to the receiving apparatus and reception timing T2 at which a response thereof has been received from the receiving apparatus as the round trip time information and transmit the round trip time to the transmitting apparatus.

According to certain embodiments, the round trip time information acquiring unit of the communication apparatus is configured to add information for falsification prevention and transmit the round trip time information to the transmitting apparatus.

According to certain embodiments, when the second communication transmits a command or a response from the transmitting apparatus to the receiving apparatus, the second communication unit sets a value of a prescribed hop number (for example, a hop number 3 defined in DTCP-IP) to a field of a header (for example, a TTL field or a Hop Limit field of an IP header) describing a restriction hop number and transmits the command or the response.

According to certain embodiments, the first network is a WAN and the second network is a LAN.

According to certain embodiments of the present application, there is provided a communication method including a first round trip time information acquiring step of acquiring first round trip time information regarding a first round trip time $RTT_L$ between a receiving apparatus becoming a transmission destination of data and a relay apparatus performing relay with the receiving apparatus, an authentication and key exchanging step of performing authentication and key exchange with the receiving apparatus through the relay apparatus, under a condition of the key exchange where the first round trip time $RTT_L$ is equal to or less than a first threshold value, and a data transmitting step of transmitting data encrypted using a key exchanged in the authentication and key exchanging step to the receiving apparatus.

According to certain embodiments of the present application, there is provided a communication method including a first communication step of performing communication with a transmitting apparatus becoming a transmission origin of data by a first network, a second communication unit performing communication with a receiving apparatus becoming a transmission destination of data by a second network, and a round trip time information acquiring step of acquiring round trip time information regarding a round trip time $RTT_L$ with the receiving apparatus on the second network and transmitting the round trip time information to the transmitting apparatus.

According to certain embodiments of the present application, there is provided a communication system including a transmitting apparatus that transmits data and a relay apparatus that performs communication with the transmitting apparatus by a first network and performs communication with a receiving apparatus becoming a transmission destination of data by a second network. The relay apparatus acquires first round trip time information regarding a round trip time $RTT_L$ with the receiving apparatus on the second network and transmits the first round trip time information to the transmitting apparatus. The transmitting apparatus performs authentication and key exchange with the receiving apparatus through the relay apparatus, under a condition of the key exchange where the first round trip time $RTT_L$ is equal to or less than a first threshold value, and transmits data encrypted using the exchanged key to the receiving apparatus.

However, the "system" mentioned here means an object obtained by logically collecting a plurality of apparatuses (or functional modules to realize specific functions) and it does not matter whether each apparatus or functional module is in a single casing.

According to certain embodiments of the present application, the relay apparatus is configured to acquire transmission timing T1 at which a command for round trip time measurement transmitted from the transmitting apparatus has been transmitted to the receiving apparatus and reception timing T2 at which a response thereof has been received from the receiving apparatus as the first round trip time information and transmit the transmission timing and the reception timing to the transmitting apparatus. The transmitting apparatus is configured to perform the authentication and key exchange with the receiving apparatus through the relay apparatus, under a condition of the key exchange where the first round trip time $RTT_L$ (=T2−T1) based on a difference of the received transmission timing and reception timing is equal to or less than the first threshold value.

According to certain embodiments of the present application, the relay apparatus is configured to acquire the first round trip time $RTT_L$ (=T2−T1) based on a difference of transmission timing T1 at which a command for round trip time measurement transmitted from the transmitting apparatus has been transmitted to the receiving apparatus and reception timing T2 at which a response thereof has been received from the receiving apparatus as the round trip time information and transmit the transmission timing and the reception timing to the transmitting apparatus. The transmitting apparatus is configured to perform the authentication and key exchange with the receiving apparatus through the relay apparatus, under a condition of the key exchange where the received first round trip time $RTT_L$ is equal to or less than the first threshold value.

According to certain embodiments of the present application, the relay apparatus is configured to add information for falsification prevention and transmit the round trip time information to the transmitting apparatus. The transmitting apparatus is configured to detect falsification of the first round trip time information on the basis of the information for the falsification prevention and set non-falsification as the condition of the key exchange.

According to certain embodiments of the present application, the transmitting apparatus is configured to measure a second round trip time $RTT_W$ until a response from the receiving apparatus is received through the relay apparatus after the command for the round trip time measurement is transmitted and set a result obtained by subtracting the first round trip time $RTT_L$ from the second round trip time $RTT_W$ being equal to or less than a second threshold value as the condition of the key exchange.

According to certain embodiments of the present application, when the relay apparatus transmits a command or a response from the transmitting apparatus to the receiving apparatus, the relay apparatus sets a value of a prescribed hop number (for example, a hop number 3 defined by DTCP-IP) to a field of a header (for example, a TTL field or a Hop Limit field of an IP header) describing a restriction hop number and transmits the command or the response.

According to certain embodiments of the present application, the first network is a WAN and the second network is a LAN.

According to certain embodiment of the present application, the second threshold value is a value that is determined on the basis of a distance of a channel connecting the communication apparatus and the relay apparatus.

According to certain embodiments of the present application, there is provided a computer program that is described with a computer readable format to cause a computer to function as a data accumulating unit that accumulates transmission data, a communication unit that performs communication with a receiving apparatus becoming a transmission destination of data and a relay apparatus performing relay with the receiving apparatus, a first round trip time information acquiring unit that acquires first round trip time information regarding a first round trip time $RTT_L$ between the relay apparatus and the receiving apparatus, an authentication and key exchanging unit that performs authentication and key exchange with the receiving apparatus through the relay apparatus, under a condition of the key exchange where the first round trip time $RTT_L$ is equal to or less than a first threshold value, and a data transmitting unit that transmits data encrypted using a key exchanged by the authentication and key exchanging unit to the receiving apparatus.

According to certain embodiments of the present application, there is provided a computer program that is described with a computer readable format to cause a computer to function as a first communication unit that performs communication with a transmitting apparatus becoming a transmission origin of data by a first network, a second communication unit that performs communication with a receiving apparatus becoming a transmission destination of data by a second network, and a round trip time information acquiring unit that acquires round trip time information regarding a round trip time $RTT_L$ with the receiving apparatus on the second network and transmits the round trip time information to the transmitting apparatus.

The computer programs according to certain embodiments of the present application define computer programs that are described in a computer readable format to realize a predetermined process on a computer. In other words, the computer programs are installed in the computer, so that a cooperative function is shown on the computer, and the same function and effect as each of the communication apparatuses according to claim 1 (or each of the transmitting apparatus and the relay apparatus in the communication system according to certain embodiments) can be obtained.

EFFECTS OF THE INVENTION

According to the technique disclosed in the present specification, a communication apparatus, a communication method, a communication system, and a computer program to be superior that enable a decryption key of encrypted content to be exchanged according to a predetermined authentication and key exchange algorithm to transmit the encrypted content, thereby preventing unjust distribution of content securely, can be provided.

According to the technique disclosed in the present specification, a communication apparatus, a communication method, a communication system, and a computer program to be superior that can prevent unjust distribution of content securely, while allowing an authentication and key exchange procedure performed via an external network such as a WAN while surpassing a limit of a round trip time, can be provided.

According to the technique disclosed in the present specification, in a communication system that includes a transmitting apparatus, a receiving apparatus, and a relay apparatus, content can be distributed from a distribution server outside the home to the receiving apparatus such as the existing TV corresponding to DLNA and DTCP-IP. In addition, a limit of a round trip time applied between a Source and a Sink in the current DTCP-IP can be applied to transmission between the relay apparatus and the receiving apparatus and unjust use (redistribution through the Internet) of the content can be prevented.

Other objects, features, and advantages of the technique disclosed in the present specification will become apparent from the following detailed description based on embodiments to be described later and the accompanying drawings.

BRIEF DESCRIPTION OF DRAWINGS

FIG. 6 is a sequence diagram illustrating an authentication process sequence of the DTCP-IP including an RTT check.

FIG. 7B is a sequence diagram illustrating an authentication process sequence of the DTCP-IP performed by the transmitting apparatus 110 and the receiving apparatus 130 with the relay apparatus 120 therebetween.

MODES FOR CARRYING OUT THE INVENTION

Hereinafter, embodiments of the technique disclosed in the present specification will be described in detail with reference to the drawings.

Figure 1:
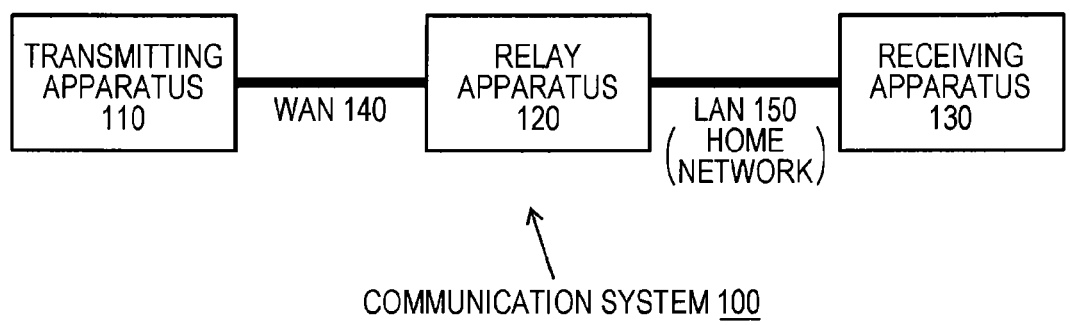
FIG. 1 is a diagram schematically illustrating a configuration example of a communication system 100 to which the technique disclosed in the present specification can be applied.

FIG. 1 schematically illustrates a configuration example of a communication system 100 to which the technique disclosed in the present specification can be applied. The communication system 100 illustrated in FIG. 1 includes a transmitting apparatus 110, a relay apparatus 120 connected to the transmitting apparatus 110 through a WAN 140, and a receiving apparatus 130 connected to the relay apparatus 120 through a home network 150 such as a LAN. The WAN 140 is, for example, the Internet. In addition, both the WAN 140 and the home network 150 are IP networks.

The transmitting apparatus 110 is a content distribution server that is disposed outside the home by a content provider who provides a content distribution service. Meanwhile, the relay apparatus 120 and the receiving apparatus 130 are disposed in the home. The relay apparatus 120 is, for example, a modem. The relay apparatus 120 is disposed between the WAN 140 from the content distribution server to the home and the home network 150 and connects these two networks. In addition, the receiving apparatus 130 is, for example, an apparatus corresponding to DTCP, such as a television receiver.

For example, the case in which the content provider manages the transmitting apparatus 110 corresponding to the content distribution server and distributes the relay apparatus 120 corresponding to the modem to each family as one of business forms of the content distribution service is assumed. Between the transmitting apparatus 110 and the relay apparatus 120, a mechanism for sharing secret information or random information, preventing falsification, and exchanging data is introduced (which will be described later).

Figure 2:
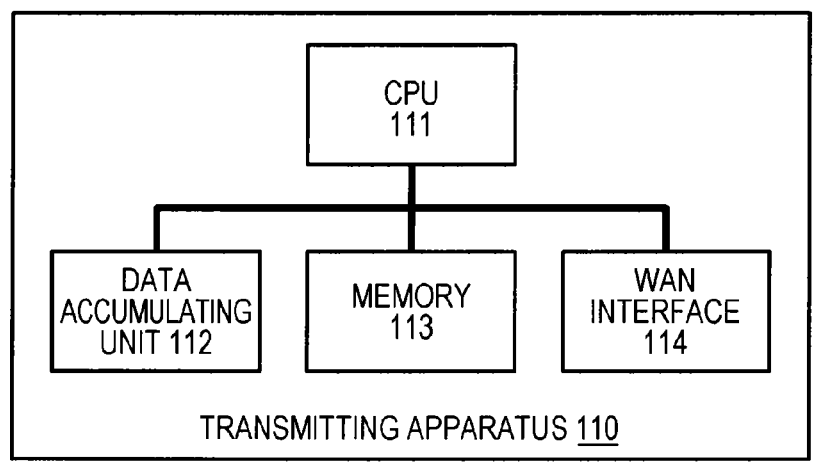
FIG. 2 is a diagram schematically illustrating an internal configuration example of a transmitting apparatus 110.

FIG. 2 schematically illustrates an internal configuration example of the transmitting apparatus 110. The transmitting apparatus 110 illustrated in FIG. 2 includes a CPU (Central Processing Unit) 111, a data accumulating unit 112 to accumulate data such as distribution content, a memory 113, and a WAN interface 114. The CPU 111 executes a predetermined program for a DTCP_Source while using the memory 113 as a work area, so that the transmitting apparatus 110 operates as the DTCP_Source, performs authentication and key exchange by AKE between a DTCP_Sink and the transmitting apparatus 110, and performs content distribution.

Figure 3:
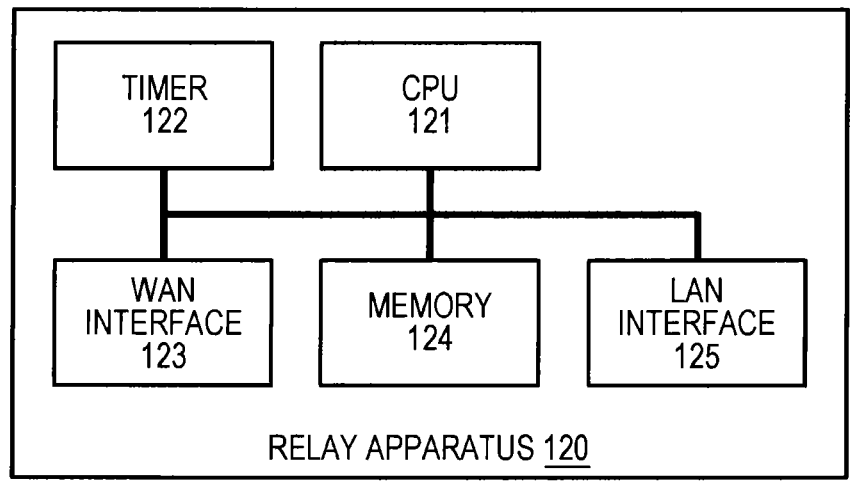
FIG. 3 is a diagram schematically illustrating an internal configuration example of a relay apparatus 120.

FIG. 3 schematically illustrates an internal configuration example of the relay apparatus 120. The relay apparatus 120 includes a CPU 121, a timer 122, a WAN interface 123, a memory 124, and a LAN interface 125. The relay apparatus 120 is connected to the transmitting apparatus 110 outside the home through the WAN interface 123 and is connected to the receiving apparatus 130 in the home, that is, on the home network through the LAN interface 125. In addition, the CPU 121 executes a predetermined program for a modem while using the memory 124 as a work area, so that the CPU 121 operates as the modem and can connect these two networks 140 and 150. In addition, the timer 122 is used for measuring a round trip time on the home network (which will be described later).

Figure 4:
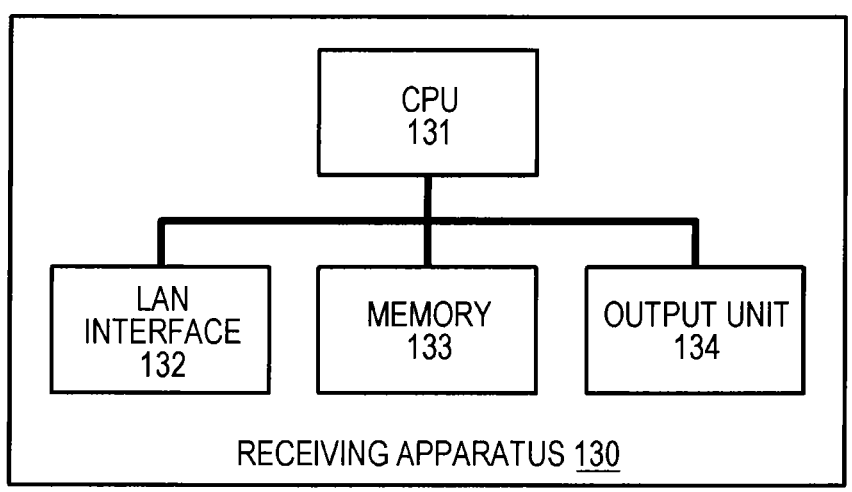
FIG. 4 is a diagram schematically illustrating an internal configuration example of a receiving apparatus 130.

FIG. 4 schematically illustrates an internal configuration example of the receiving apparatus 130. The receiving apparatus 130 illustrated in FIG. 4 includes a CPU 131, a LAN interface 132, a memory 133, and an output unit 134. The CPU 131 executes a predetermined program for a DTCP_Sink while using the memory 133 as a work area, so that the receiving apparatus 130 operates as the DTCP_Sink, performs authentication and key exchange by the AKE between the DTCP_Source and the receiving apparatus 130, and receives content distributed from the DTCP_Source. In addition, the output unit 134 executes a reproduction process of content received through the relay apparatus 120, such as a moving image.

In the communication system 100 illustrated in FIG. 1, a content distribution service such as a moving image can be performed. At this time, DLNA or DTCP-IP is used between the transmitting apparatus 110 to be the content distribution server and the receiving apparatus 130 such as the television receiver in the home, so that unjust distribution of the content can be prevented.

However, it is unreasonable to manage the content distribution service in a state in which a threshold value of an RTT is a value (a maximum of 7 milliseconds) assuming the current home use. The reason is as follows. If the transmitting apparatus 110 outside the home performs an RTT check for the receiving apparatus 130 in the home, the threshold value cannot be satisfied. As a result, the receiving apparatus 130 cannot receive content.

Therefore, in this embodiment, measurement to obtain a round trip time $RTT_L$ between the relay apparatus 120 and the receiving apparatus 130 is performed by the relay apparatus 120 that is disposed between the WAN 140 and the home network 150 and connects these two networks (for this reason, the relay apparatus 120 includes the timer 122 for RTT measurement, as illustrated in FIG. 3). In addition, that a local $RTT_L$ value on the home network 150 is equal to or less than the threshold value (defined by the DTCP-IP) is set as a content distribution condition (or a key exchange condition) from the transmitting apparatus 110, so that the same use environment (that is, prevention of unjust distribution of content) as a system using the current DLNA and DTCP-IP can be realized for content use in the home network 150.

Figure 5:
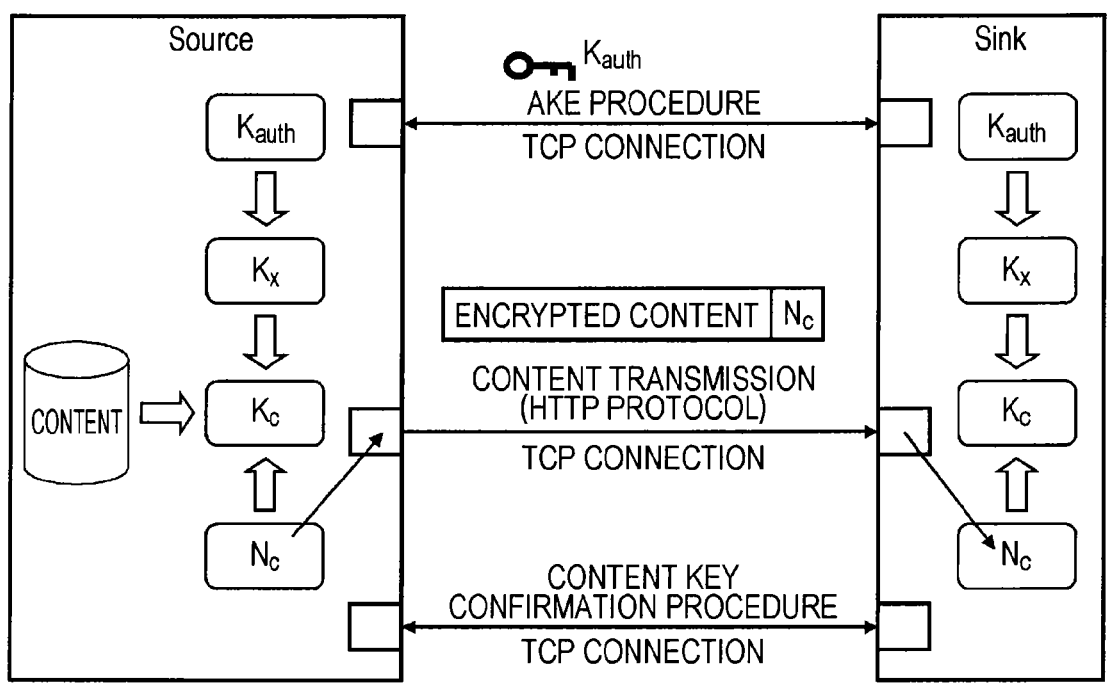
FIG. 5 is a diagram illustrating a mechanism for performing encrypted content transmission by DTCP-IP between a Source and a Sink.

Here, a mechanism for performing encrypted content transmission by the DTCP-IP between the Source and the Sink will be described with reference to FIG. 5.

The Source and the Sink first establish one TCP/IP connection and perform authentication (AKE procedure) between apparatuses. An apparatus certificate published by the DTLA (described above) is embedded in a DTCP-compliant apparatus. In the AKE procedure, after it is confirmed that the Source and the Sink are regular DTCP-compliant apparatuses, an authentication key $K_{auth}$ can be shared between the Source and the Sink.

If the AKE procedure is succeeded, the Source generates an exchange key $K_x$ becoming the origin of a content key $K_c$, encrypts the exchange key $K_x$ with the authentication key $K_{auth}$, and transmits the exchange key $K_x$ to the Sink. In each of the Source and the Sink, a predetermined operation process is applied to the exchange key $K_x$, so that the content key $K_c$ used to encrypt content at the time of content transmission can be generated.

In addition, after the authentication and key exchange procedure by the AKE between the DTCP-compliant apparatuses is terminated, content transmission starts using a protocol such as HTTP (Hyper Text Transfer Protocol) or RTP (real Time Protocol). In the example illustrated in the drawings, the content transmission is performed according to a procedure of the HTTP. At this time, TCP/IP connection for the HTTP is generated, separately from the TCP/IP connection for the AKE procedure.

In order to perform the content transmission according to an HTTP protocol, two formats of a download format in which the Sink requests the Source to transmit content and an upload format in which content is pushed from the Source side to the Sink are used. In the case of the former, the Sink corresponding to an HTTP client requests the Source corresponding to an HTTP server to provide content by an HTTP request using an HTTP GET method and the requested content is transmitted as an HTTP response, from the Source. In addition, in the case of the latter, the Source corresponding to the HTTP client starts transmission with the Sink corresponding to the HTTP server by an HTTP request using an HTTP POST method.

Data that is transmitted from the Source becomes data that is obtained by encrypting content using a key shared by the Source after performing the AKE authentication. Specifically, the Source generates a nonce $N_c$ using a random number and generates a content key $K_c$ according to the exchange key $K_x$, the nonce $N_c$, and an encryption mode. In addition, the Source encrypts the content requested from the Sink using the content key $K_c$, includes a payload including the encrypted content and a packet including a header including the nonce $N_c$ and information of the encryption mode in a TCP stream, and transmits the TCP stream. In the IP protocol, the TCP stream is divided by a size of a packet becoming a predetermined unit, is converted into an IP packet to which a header portion has been added, and is transmitted to the destination of a designated IP address.

At the Sink side, if each IP packet from the Source is received, each IP packet is assembled into a TCP stream. In addition, if the nonce $N_c$ and E-EMI are extracted from the stream, the content key $K_c$ can be calculated by using the nonce $N_c$ and the E-EMI and the exchange key $K_x$ and the encrypted content can be decrypted. In addition, a reproduction process can be executed with respect to content of a plain text after the decryption.

The RTT check of the DTCP-IP is described in a section called Protected RTT Protocol of DTCP Volume 1 Specification Supplement E. Hereinafter, an authentication process sequence of the DTCP-IP including the RTT check will be described with reference to FIG. 6.

In a challenge-response portion of the AKE procedure (Challenge-Response portion of AKE), first, an Rx challenge including an Rx random number and an Rx certificate is transmitted from the Sink requesting for the content. Meanwhile, a Tx challenge including a Tx random number and a Tx certificate is returned from the Source. Hereinafter, an Rx response including a Rx random number, a Tx message, and a Tx signature is transmitted from the Source, a Tx response including a Tx random number, an Rx message, and an Rx signature is transmitted from the Sink, and a normal challenge-response authentication procedure is continued (not illustrated in the drawings).

After the challenge-response portion of the AKE procedure is completed, a command RTT_READY.CMD is transmitted from the Source (C601), a response RTT_READY.RSP is returned from the Sink (C602), a command RTT_READY.CMD is transmitted from the Sink (C603), a response RTT_READY.RSP is returned from the Source (C604), and thus, a protected RTT protocol starts. At this time, at the source side, two kinds of message authentication codes MAC1A and MAC2A are calculated (S610) and at the Sink side, two kinds of message authentication codes MAC1B and MAC2B are calculated by the same calculation method (S630). The Source transmits a variable N by a command RTT_SETUP(N).CMD (C605). Meanwhile, the Sink returns a response and ACCEPTED(N).RSP (C606). However, both the Source and the Sink prepare a message authentication code for a variable N to be transmitted herein.

In addition, the Source transmits RTT_TEST(MAC1A).CMD to be a command for RTT measurement (C607) and the Sink returns ACCEPTED(MAC2B).RSP to be a response to RTT_TEST(MAC1A).CMD (C608).

The Source performs a check on whether a round trip time RTT until a response is received after the command for the RTT measurement is transmitted is equal to or less than a prescribed threshold value (7 milliseconds), that is, an RTT check (S611). When the RTT is more than the threshold value (No of S611), the Source checks whether the number of trials is not more than 1023 (S612). When the number of trials is not more than 1023 (Yes of S612), after the Source increments N by 1, the Source prepares a message authentication code corresponding to new N and transmits an RTT_SETUP(N) command (C605). Also, the Sink prepares a message authentication code corresponding to the new N and transmits an ACCEPTED(N) response. In this way, the transmission of the command for the RTT measurement and the return of the response are repeated between the Source and the Sink. When the number of trials is more than 1023 (No of S612), the Source aborts this authentication sequence.

Meanwhile, when the RTT is equal to or less than the threshold value (Yes of S611), the Source checks whether the message authentication code MAC2B received by ACCEPTED(MAC2B).RSP is matched with MAC2A generated by the Source (S613). When the message authentication code MAC2B is not matched with MAC2A (No of S613), the Source aborts this authentication sequence.

When the message authentication codes MAC2A and MAC2B are matched with each other (Yes of S613), the Source transmits an RTT verification command RTT_VERIFY.CMD (C609). In response to the command (No of S631), the Sink checks whether the message authentication code MAC1A received by RTT_TEST(MAC1A).CMD is matched with MAC1B generated by the Sink (S632). When the message authentication code MAC1A is not matched with MAC1B (No of S632), the Sink aborts this authentication sequence. When the message authentication code MAC1A is matched with MAC1B (Yes of S632), the Sink returns ACCEPTED(OKMSG).RSP (C610).

If the Source receives ACCEPTED(OKMSG).RSP from the Sink, the Source verifies a message OKMSG included in ACCEPTED(OKMSG).RSP (S614). When the Source succeeds in verification of the message OKMSG (Yes of S614), the Source adds the Sink to an RTT registry and sets a content transmission counter to 40 hours (S615). When the Source fails in verification of the message OKMSG (No of S614), the source aborts this authentication sequence.

Figure 7A:
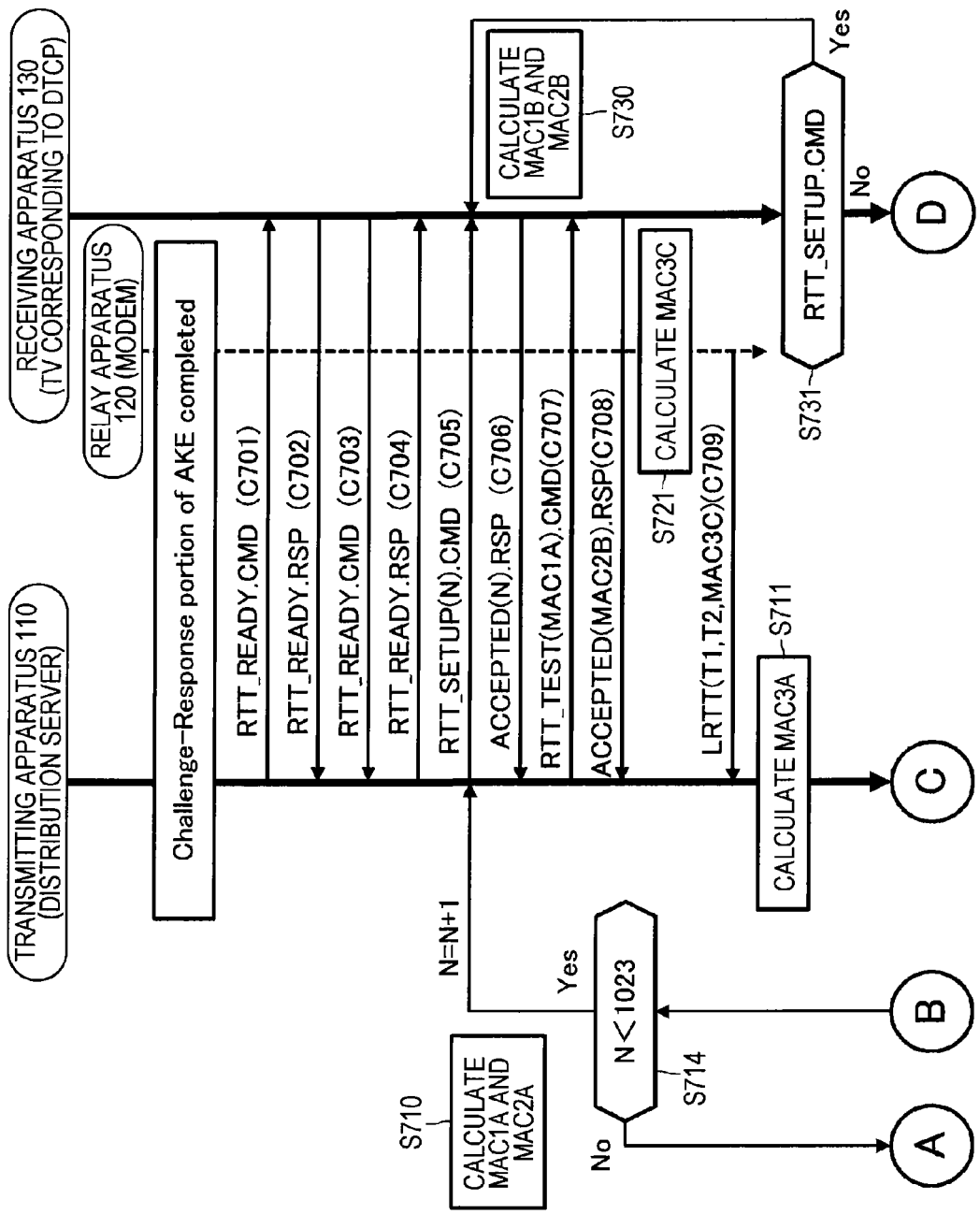
FIG. 7A is a sequence diagram illustrating an authentication process sequence of the DTCP-IP performed by the transmitting apparatus 110 and the receiving apparatus 130 with the relay apparatus 120 therebetween.

FIGS. 7A and 7B illustrate an authentication process sequence of the DTCP-IP including the RTT check performed by the transmitting apparatus 110 to be the Source and the receiving apparatus 130 to be the Sink with the relay apparatus 120 therebetween, in the communication system 100 illustrated in FIG. 1.

Between the transmitting apparatus 110 and the receiving apparatus 130, following the challenge-response portion of the AKE procedure (Challenge-Response portion of AKE), transmission and reception of RTT_READY.CMD to instruct to prepare for the RTT measurement and a response RTT_READY.RSP thereof, a command RTT_SETUP(N).CMD showing the RTT measurement start and a response ACCEPTED(N).RSP thereof, and a command RTT_TEST (MAC1A).CMD for the RTT measurement and a response ACCEPTED(MAC2B).RSP thereof are performed (C701 to C708). However, the relay apparatus 120 passes all these messages.

The relay apparatus 120 relays the command RTT_TEST (MAC1A).CMD for the RTT measurement and the response ACCEPTED(MAC2B).RSP to the command RTT_TEST (MAC1A).CMD between the transmitting apparatus 110 and the receiving apparatus 130, the relay apparatus 120 records timing T1 at which RTT_TEST(MAC1A).CMD is transmitted to the receiving apparatus 130 and timing T2 at which ACCEPTED(MAC2B).RSP is received from the receiving apparatus 130, using the internal timer 122. In addition, the relay apparatus 120 includes timing information T1 and T2 in the local RTT message LRTT, and transmits the local RTT message LRTT to the transmitting apparatus 110 (C709).

If the transmitting apparatus 110 receives the local RTT message LRTT from the relay apparatus 120, the transmitting apparatus 110 performs the RTT check (S713). However, the transmitting apparatus 110 checks whether, instead of the round trip time RTT until the transmitting apparatus 110 receives the response after transmitting the command for the RTT measurement, a difference of T1 and T2 (that is, the round trip time until the relay apparatus 120 receives the response after transmitting the command for the RTT measurement to the receiving apparatus 130) is equal to or less than the prescribed threshold value (7 milliseconds). In addition, when T2–T1 is more than the threshold value (No of S713), the transmitting apparatus 110 checks whether the number of trials is not more than 1023 (S714). When the number of trials is not more than 1023 (Yes of S714), after the transmitting apparatus 110 increments N by 1, the transmitting apparatus 110 prepares a message authentication code corresponding to new N and transmits an RTT_SETUP(N) command (C705). Also, the receiving apparatus 130 prepares a message authentication code corresponding to the new N and transmits an ACCEPTED(N) response. In this way, the transmission of the command for the RTT measurement and the return of the response are repeated between the transmitting apparatus 110 and the receiving apparatus 130. When the number of trials is more than 1023 (No of C714), the transmitting apparatus 110 aborts this authentication sequence.

Meanwhile, when T2–T1 is equal to or less than the threshold value (Yes of S713), the transmitting apparatus 110 further checks whether the message authentication code MAC2B received by ACCEPTED(MAC2B).RSP is matched with MAC2A generated by the transmitting apparatus 110 (S715). When the message authentication code MAC2B is not matched with MAC2A (No of S715), the transmitting apparatus 110 aborts this authentication sequence.

When the message authentication codes MAC2A and MAC2B are matched with each other (Yes of S715), the transmitting apparatus 110 transmits an RTT verification command RTT_VERIFY.CMD (C710). In response to the command (S731), the receiving apparatus 130 further checks whether the message authentication code MAC1A received by RTT_TEST(MAC1A).CMD is matched with MAC1B generated by the receiving apparatus 130 (S732). When the message authentication code MAC1A is not matched with MAC1B (No of S732), the receiving apparatus 130 aborts this authentication sequence. When the message authentication code MAC1A is matched with MAC1B (Yes of S732), the receiving apparatus 130 returns ACCEPTED(OKMSG).RSP (C711).

If the transmitting apparatus 110 receives ACCEPTED (OKMSG).RSP from the receiving apparatus 130, the transmitting apparatus 110 verifies a message OKMSG included in ACCEPTED(OKMSG).RSP (S716). If the transmitting apparatus 110 succeeds in verification of the message OKMSG (Yes of S716), the transmitting apparatus 110 adds the receiving apparatus 130 to an RTT registry and sets a content transmission counter to 40 hours (S717). If the transmitting apparatus 110 fails in verification of the message OKMSG (No of S716), the transmitting apparatus 110 aborts this authentication sequence.

When a TTL field of an IP header of a received packet has a value more than 3, the receiving apparatus 130 corresponding to DTCP-IP discards an IP datagram thereof. For this reason, when the transmitting apparatus cannot surely control a value of a TTL field at a point of time when arriving at the relay apparatus 120, the value of the TTL field of the packet that is transmitted from the relay apparatus 120 to the receiving apparatus 130 may become equal to or more than 4. In this case, even if the difference of T1 and T2 is not more than the limit of the round trip time, the receiving apparatus 130 cannot receive the TTL field. Therefore, in a communication sequence illustrated in FIGS. 7A and 7B, the relay apparatus 120 may set 3 to be the prescribed number of hops to the TTL field of the IP header at all times, when transmitting the TTL field to the receiving apparatus 130.

Figure 8A:
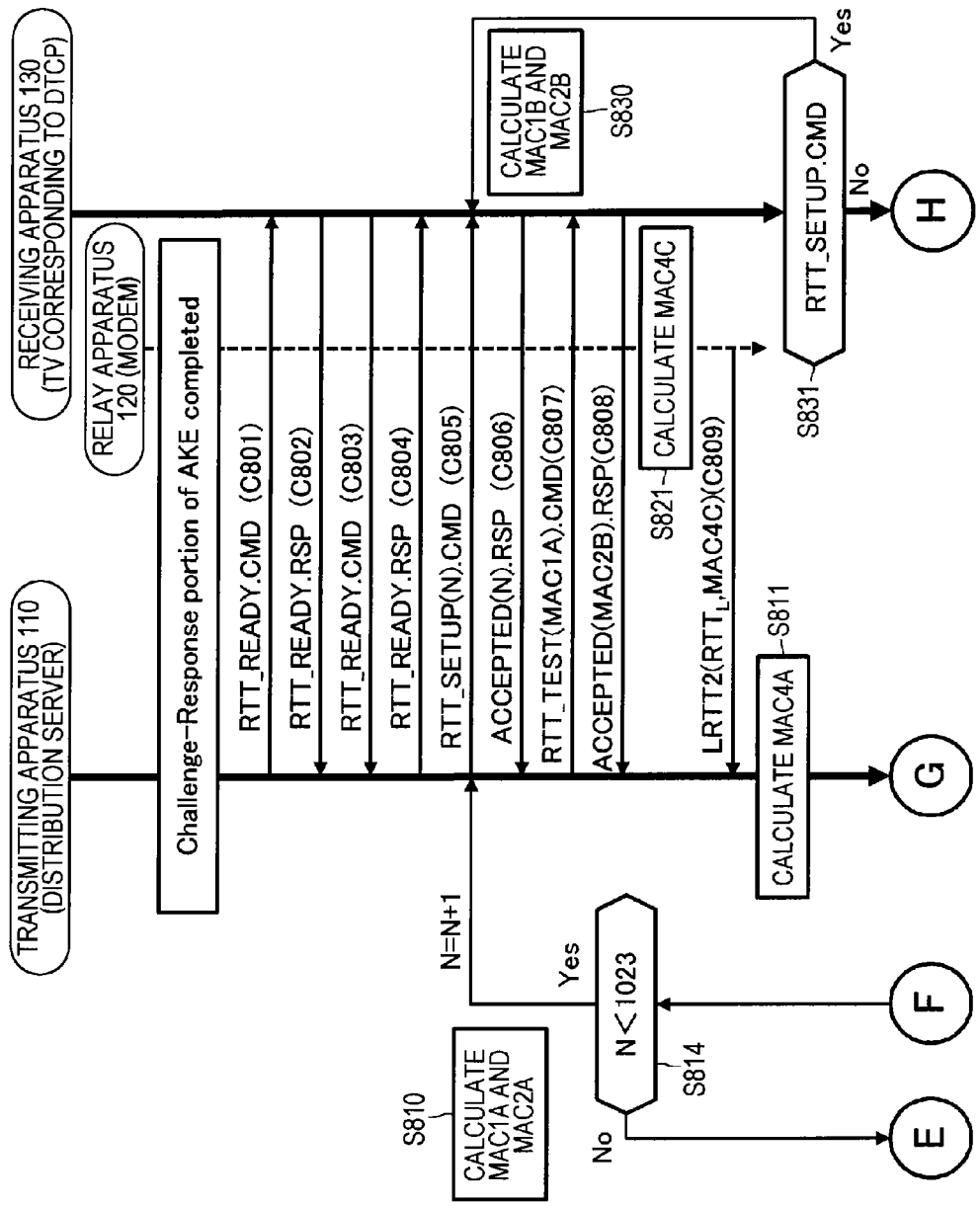
FIG. 8A is a sequence diagram illustrating a modification of an authentication process sequence of the DTCP-IP performed by the transmitting apparatus 110 and the receiving apparatus 130 with the relay apparatus 120 therebetween.
Figure 8B:
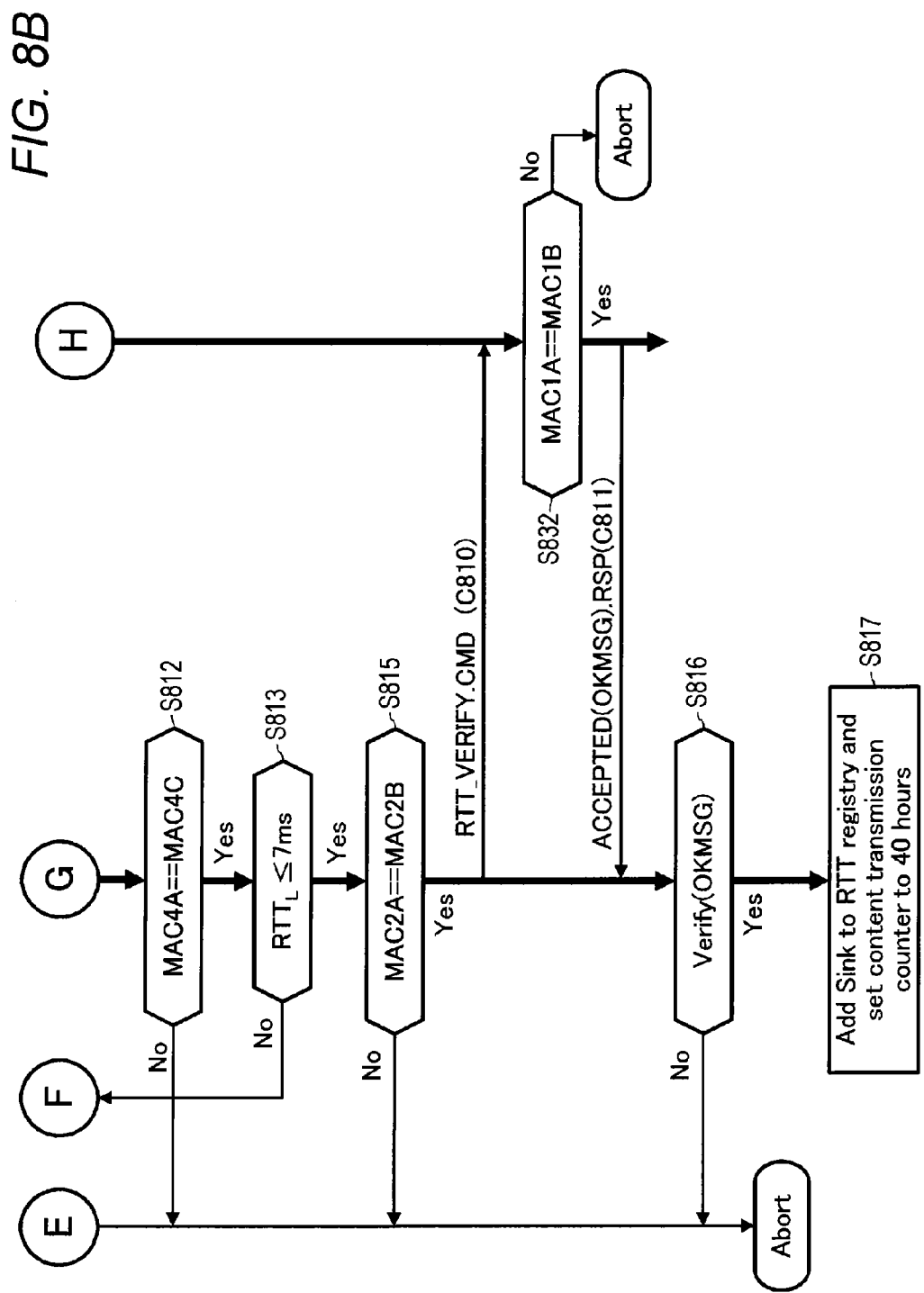
FIG. 8B is a sequence diagram illustrating a modification of an authentication process sequence of the DTCP-IP performed by the transmitting apparatus 110 and the receiving apparatus 130 with the relay apparatus 120 therebetween.

FIGS. 8A and 8B illustrate a modification of an authentication process sequence of the DTCP-IP performed by the transmitting apparatus 110 and the receiving apparatus 130 with the relay apparatus 120 therebetween. Similar to the sequence example illustrated in FIGS. 7A and 7B, a protected RTT protocol is included in the authentication process sequence illustrated in FIGS. 8A and 8B.

In the protected RTT protocol, transmission and reception of RTT_READY.CMD to instruct to prepare for the RTT measurement and a response RTT_READY.RSP thereof, a command RTT_SETUP(N).CMD showing the RTT measurement start and a response ACCEPTED(N).RSP thereof, a command RTT_TEST(MAC1A).CMD for the RTT measurement and a response ACCEPTED(MAC2B).RSP thereof are performed (C801 to C808). However, the relay apparatus 120 passes all these messages.

Similar to the sequence example illustrated in FIGS. 7A and 7B, the relay apparatus 120 records timing T1 at which RTT_TEST(MAC1A).CMD is transmitted to the receiving apparatus 130 and timing T2 at which ACCEPTED (MAC2B).RSP is received from the receiving apparatus 130, using the internal timer 122. However, the sequence examples are different in that the relay apparatus 120 calculates interval data T2−T1 (=$RTT_L$) showing a difference of T2−T1, not the timing information T1 and T2, adds the interval data $RTT_L$ to a local RTT message LRTT2, and transmits the interval data $RTT_L$ (C809).

If the transmitting apparatus 110 receives the local RTT message LRTT2 from the relay apparatus 120, the transmitting apparatus 110 performs the RTT check (S813). However, the transmitting apparatus 110 checks whether, instead of the round trip time until the transmitting apparatus 110 receives the response after transmitting the command for the RTT measurement, the interval data (that is, the round trip time until the relay apparatus 120 receives the response after transmitting the command for the RTT measurement to the receiving apparatus 130) $RTT_L$ received from the relay apparatus 120 is equal to or less than the prescribed threshold value (7 milliseconds). In addition, when the interval data $RTT_L$ is more than the threshold value (No of step S813), the transmitting apparatus 110 further checks whether the number of trials is not more than 1023 (S814). When the number of trials is not more than 1023 (Yes of S814), after the transmitting apparatus 110 increments N by 1, the transmitting apparatus 110 prepares a message authentication code corresponding to new N and transmits an RTT_SETUP(N) command (C805). Also, the receiving apparatus 130 prepares a message authentication code corresponding to the new N and transmits an ACCEPTED(N) response. In this way, the transmission of the command for the RTT measurement and the return of the response are repeated between the transmitting apparatus 110 and the receiving apparatus 130. When the number of trials is more than 1023 (No of S814), the transmitting apparatus 110 aborts this authentication sequence.

Meanwhile, when the interval data $RTT_L$ is equal to or less than the threshold value, the transmitting apparatus 110 further checks whether the message authentication code MAC2B received by ACCEPTED(MAC2B).RSP is matched with MAC2A generated by the transmitting apparatus 110 (S815). When the message authentication code MAC2B is not matched with MAC2A (No of S815), the transmitting apparatus 110 aborts this authentication sequence.

When the message authentication codes MAC2A and MAC2B are matched with each other (Yes of S815), the transmitting apparatus 110 transmits an RTT verification command RTT_VERIFY.CMD (C810). In response to the command, the receiving apparatus 130 checks whether the message authentication code MAC1A received by RTT_TEST(MAC1A).CMD is matched with MAC1B generated by the receiving apparatus 130 (S732). When the message authentication code MAC1A is not matched with MAC1B (No of S883), the receiving apparatus 130 aborts this authentication sequence. When the message authentication code MAC1A is matched with MAC1B, the receiving apparatus 130 returns ACCEPTED(OKMSG).RSP (C811).

If the transmitting apparatus 110 receives ACCEPTED (OKMSG).RSP from the receiving apparatus 130, the transmitting apparatus 110 verifies a message OKMSG included in ACCEPTED(OKMSG).RSP (S816). If the transmitting apparatus 110 succeeds in verification of the message OKMSG (Yes of S816), the transmitting apparatus 110 adds the receiving apparatus 130 to an RTT registry and sets a content transmission counter to 40 hours (S817). If the transmitting apparatus 110 fails in verification of the message OKMSG (No of S816), the transmitting apparatus 110 aborts this authentication sequence.

When a TTL field of an IP header of a received packet has a value more than 3, the receiving apparatus 130 corresponding to the DTCP-IP discards an IP datagram thereof. Therefore, in a communication sequence illustrated in FIGS. 8A and 8B, the relay apparatus 120 may set 3 to be the prescribed number of hops to the TTL field of the IP header at all times, when transmitting the TTL field to the receiving apparatus 130 (similar to the above case).

An electronic signature or a message authentication code (MAC) may be added to the timing information T1 and T2 or the interval data $RTT_L$ transmitted from the relay apparatus 120 to the transmitting apparatus 110 to prevent falsification.

In the communication sequence example illustrated in FIGS. 7A and 7B, the relay apparatus 120 calculates a message authentication code MAC3C (S721) and adds MAC3C to the timing information T1 and T2 and transmits a local RTT message LRTT (T1, T2, and MAC3C) (C709). Meanwhile, at the side of the transmitting apparatus 110, a message authentication code MAC3A is calculated using the received timing information T1 and T2 (S711). The received MAC3C is matched with MAC3A (S712), so that validity of the timing information T1 and T2 can be checked.

In addition, in the communication sequence example illustrated in FIGS. 8A and 8B, the relay apparatus 120 calculates a message authentication code MAC4C (S821) and adds MAC4C to the interval data $RTT_L$ and transmits a local RTT message LRTT2 ($RTT_L$ and MAC4C) (C809). Meanwhile, at the side of the transmitting apparatus 110, a message authentication code MAC4A is calculated using the received interval data $RTT_L$ (S811). The received MAC4C is matched with MAC4A (S812), so that validity of the interval data $RTT_L$ can be checked.

Here, a mechanism for preventing falsification of data between the transmitting apparatus 110 and the relay apparatus 120 will be described in detail.

For example, the relay apparatus 120 sets a result obtained by encrypting the timing information T1 and T2 or the interval data $RTT_L$ and random information shared by the transmitting apparatus 110 and the relay apparatus 120 with a private key as a message authentication code by a public key encryption process and transmits the result together with a public key to which an electronic signature has been added by a reliable certificate authority. In this case, at the side of the transmitting apparatus 110, validity of the received timing information T1 and T2 or interval data $RTT_L$ can be confirmed by comparing the a result obtained by deciphering a code of the message authentication code with the public key and the timing information T1 and T2 or the interval data $RTT_L$.

Or, the relay apparatus 120 processes a session key shared between the transmitting apparatus 110 and the relay apparatus 120 and the timing information T1 and T2 or the interval data $RTT_L$ by a hash function and obtains a message authentication code. In this case, at the side of the transmitting apparatus 110, validity of the timing information T1 and T2 or the interval data $RTT_L$ can be confirmed by comparing an expectation value of a message authentication code calculated by the same hash process and a received message authentication code.

It is considered that the MAC1A calculated at the side of the transmitting apparatus 110 or random challenge data transmitted while an authentication process (challenge-response portion of the AKE procedure) is executed from the transmitting apparatus 110 to the receiving apparatus 130, is used for random information shared between the relay apparatus 120 and the transmitting apparatus 110. In addition, a method in which the relay apparatus 120 includes an authentication function of DTCP and executes an authentication process of the DTCP with the transmitting apparatus 110 to use a shared key, is considered for the session key shared between the relay apparatus 120 and the transmitting apparatus 110.

In the above description, attention is paid to the round trip time $RTT_L$ between the relay apparatus 120 and the receiving apparatus 130, when DTCP-IP is applied to a content distribution service. Furthermore, it is considered that the round trip time between the transmitting apparatus 110 and the relay apparatus 120 is checked by separately setting a threshold value $D_W$.

Because the relay apparatus 120 and the receiving apparatus 130 are in the home, the threshold value (7 milliseconds) set in the related art can be used as it is. Meanwhile, the transmitting apparatus 110 and the relay apparatus 120 are connected through the WAN 140 and the round trip time between the transmitting apparatus 110 and the relay apparatus 120 depends on a distance. For this reason, if a farthest place in an area where the transmitting apparatus 110 performs content distribution is determined, the threshold value $D_W$ corresponding to the farthest place can be determined.

By further checking the round trip time between the transmitting apparatus 110 and the relay apparatus 120, a situation where the relay apparatus 120 is disposed outside a distribution area of the transmitting apparatus 110 functioning as a content distribution server to receive content can be prevented from being generated. The transmitting apparatus 110 can acquire the round trip time between the transmitting apparatus 110 and the relay apparatus 120 by subtracting the round trip time $RTT_L$ between the relay apparatus 120 and the receiving apparatus 130 from an interval $RTT_W$ until the transmitting apparatus 110 receives a corresponding response after transmitting the command for the RTT measurement.

Figure 9:
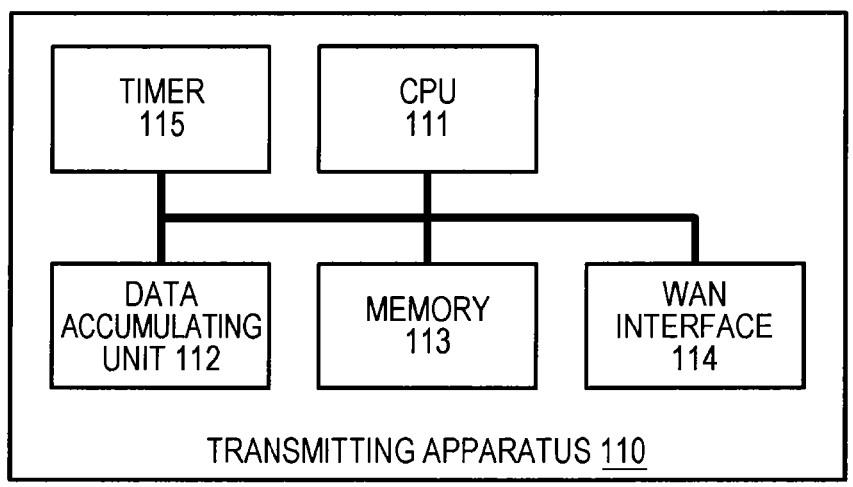
FIG. 9 is a diagram schematically illustrating an internal configuration example of the transmitting apparatus 110 including a function of measuring a round trip time with the relay apparatus 120.

FIG. 9 schematically illustrates an internal configuration example of the transmitting apparatus 110 including a function of measuring a round trip time between the transmitting apparatus 110 and the relay apparatus 120. The transmitting apparatus 110 illustrated in FIG. 9 includes a timer 115, in addition to a CPU 111, a data accumulating unit 112 that accumulates data such as distribution content, a memory 113, and a WAN interface 114. The CPU 111 executes a predetermined program for DTCP_Source while using the memory 113 as a work area, so that the transmitting apparatus 110 operates as the DTCP_Source, performs authentication and key exchange by the AKE between the DTCP_Sink and the transmitting apparatus 110, and performs the content distribution (similar to the above case). In addition, the timer 115 is used to measure an interval until the timer 115 receives a corresponding response after transmitting the command for the RTT measurement.

Figure 10A:
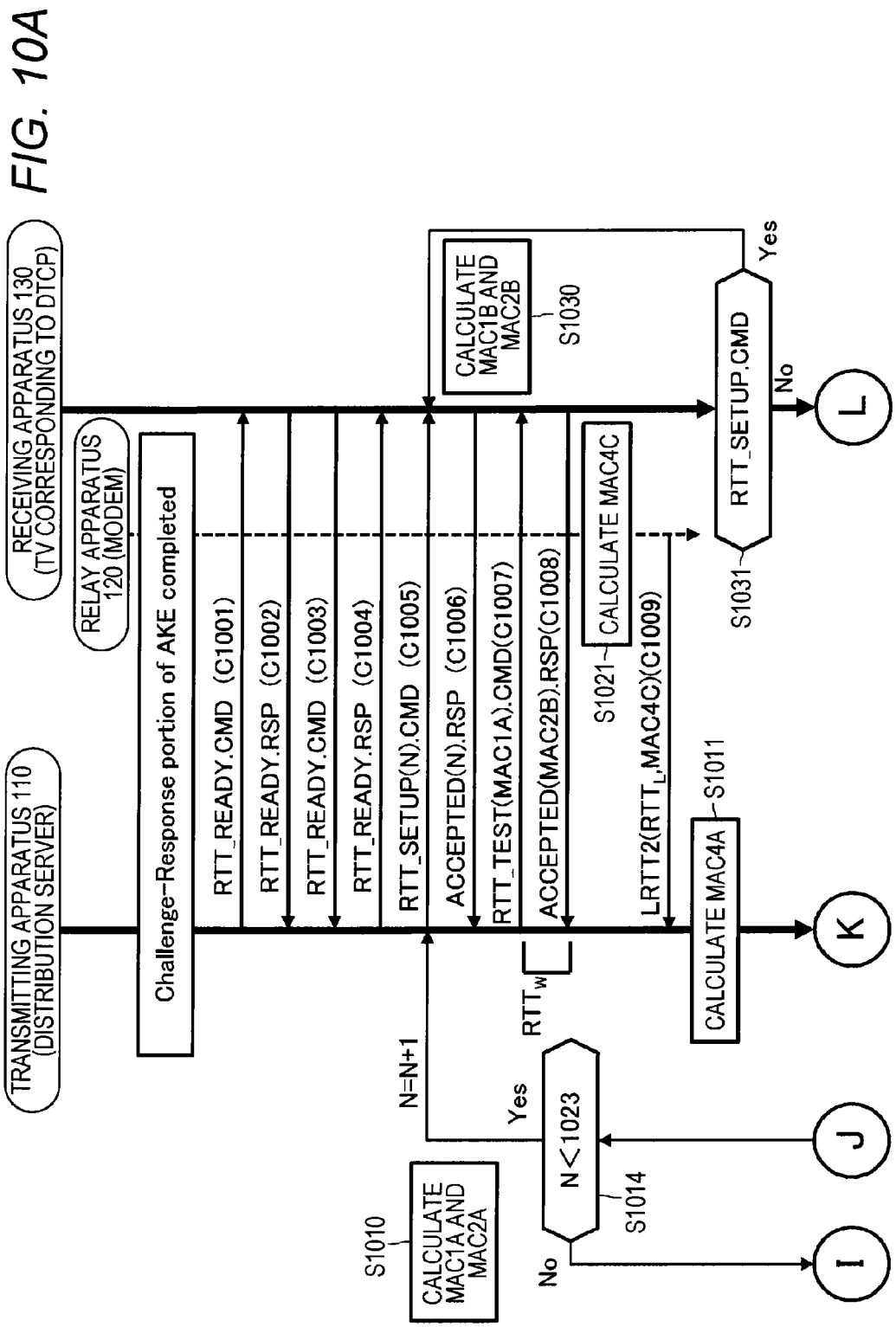
FIG. 10A is a sequence diagram illustrating an authentication process sequence of the DTCP-IP including a check of a round trip time between the transmitting apparatus 110 and the relay apparatus 120.
Figure 10B:
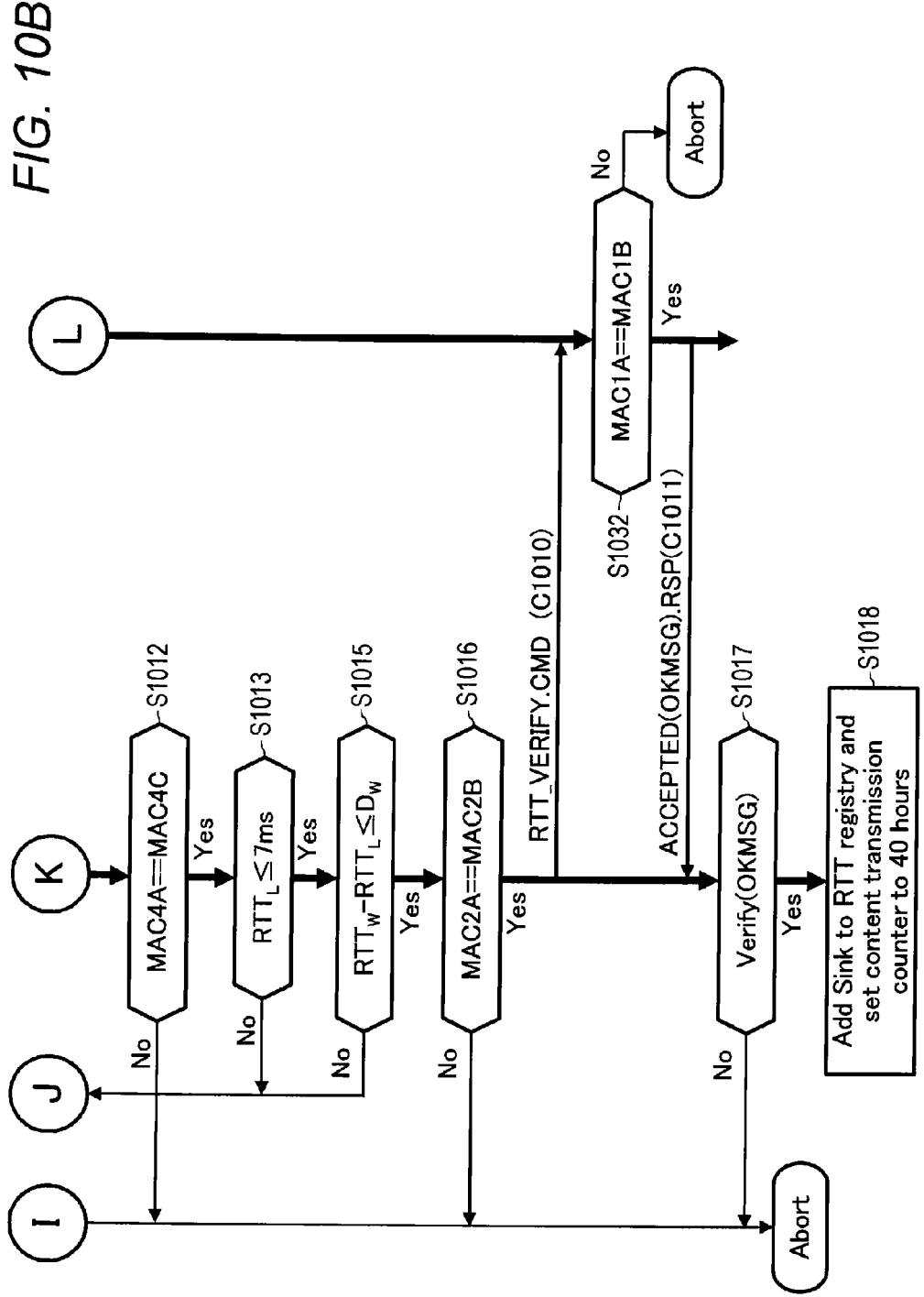
FIG. 10B is a sequence diagram illustrating an authentication process sequence of the DTCP-IP including a check of a round trip time between the transmitting apparatus 110 and the relay apparatus 120.

FIGS. 10A and 10B illustrate an authentication process sequence of the DTCP-IP including a check of a round trip time between the transmitting apparatus 110 and the relay apparatus 120.

Between the transmitting apparatus 110 and the receiving apparatus 130, following the challenge-response portion of the AKE procedure (Challenge-Response portion of AKE), transmission and reception of RTT_READY.CMD to instruct to prepare for the RTT measurement and a response RTT_READY.RSP thereof, a command RTT_SETUP(N).CMD showing the RTT measurement start and a response ACCEPTED(N).RSP thereof, and a command RTT_TEST (MAC1A).CMD for the RTT measurement and a response ACCEPTED(MAC2B).RSP thereof are performed (C1001 to C1008). However, the relay apparatus 120 passes all these messages.

Here, the transmitting apparatus 110 measures the interval $RTT_W$ until the transmitting apparatus 110 receives a corresponding response ACCEPTED(MAC2B).RSP after transmitting a command RTT_TEST(MAC1A).CMD for RTT measurement, using the timer 115, and records the interval.

Meanwhile, when the relay apparatus 120 relays the command RTT_TEST(MAC1A).CMD for the RTT measurement and the response ACCEPTED(MAC2B).RSP to the command RTT_TEST(MAC1A).CMD between the transmitting apparatus 110 and the receiving apparatus 130, the relay apparatus 120 records timing T1 at which RTT_TEST (MAC1A).CMD is transmitted to the receiving apparatus 130 and timing T2 at which ACCEPTED(MAC2B).RSP is received from the receiving apparatus 130, using the internal timer 122. In addition, the relay apparatus 120 adds an electronic signature or a message authentication code (MAC) to prevent falsification, when the relay apparatus 120 transmits the interval data $RTT_L$ (=T2−T1) to the transmitting apparatus 110. In the example illustrated in the drawing, the relay apparatus 120 calculates a message authentication code MAC4C (S1021) and includes the interval data $RTT_L$ showing the difference of the timing information and the message authentication code MAC4C in a local RTT message LRTT2 and transmits the local RTT message LRTT2 (C1009).

If the transmitting apparatus 110 receives the local RTT message LRTT2 from the relay apparatus 120, the transmitting apparatus 110 calculates the message authentication code MAC4A using the received interval data $RTT_L$ (S1011) and further checks whether the message authentication code MAC4A is matched with the message authentication code MAC4C included in the local RTT message LRTT2 (S1012). When the message authentication code MAC4A is not matched with the message authentication code MAC4C (No of S1012), the transmitting apparatus 110 aborts this authentication sequence.

When the message authentication codes MAC4A and MAC4C are matched with each other (Yes of S1012), the transmitting apparatus 110 checks whether the interval data $RTT_L$ included in the local RTT message LRTT2 is equal to or less than the prescribed threshold value (7 milliseconds) (S1013). In addition, when the interval data $RTT_L$ is more than the threshold value (No of S1013), the transmitting apparatus 110 further checks whether the number of trials is not more than 1023 (S1014). When the number of trials is not more than 1023 (Yes of S1014), after the transmitting apparatus 110 increments N by 1, the transmitting apparatus 110 prepares a message authentication code corresponding to new N and transmits an RTT_SETUP(N) command (C1005). Also, the receiving apparatus 130 prepares a message authentication code corresponding to the new N and transmits an ACCEPTED(N) response. In this way, the transmission of the command for the RTT measurement and the return of the response are repeated between the transmitting apparatus 110 and the receiving apparatus 130. When the number of trials is more than 1023 (No of S1014), the transmitting apparatus 110 aborts this authentication sequence.

Meanwhile, when the interval data $RTT_L$ is equal to or less than the threshold value (Yes of S1013), the transmitting apparatus 110 acquires the round trip time ($RTT_W$−$RTT_L$) between the transmitting apparatus 110 and the relay apparatus 120 by subtracting the round trip time $RTT_L$ between the relay apparatus 120 and the receiving apparatus 130 from an interval $RTT_W$ until the transmitting apparatus 110 receives ACCEPTED(MAC2B).RSP after transmitting RTT_TEST (MAC1A).CMD. In addition, the transmitting apparatus 110 checks whether the round trip time ($RTT_W$−$RTT_L$) is equal to or less than the threshold value $D_W$ (S1015).

When the round trip time ($RTT_W$−$RTT_L$) is more than the threshold value $D_W$ (No of S1015), the transmitting apparatus 110 further checks whether the number of trials is not more than 1023 (S1014). When the number of trials is not more than 1023 (Yes of S1014), after the transmitting apparatus 110 increments N by 1, the transmitting apparatus 110 prepares a message authentication code corresponding to new N and transmits an RTT_SETUP(N) command (C1005). Also, the receiving apparatus 130 prepares a message authentication code corresponding to the new N and transmits an ACCEPTED(N) response. In this way, the transmission of the command for the RTT measurement and the return of the response are repeated between the transmitting apparatus 110 and the receiving apparatus 130. When the number of trials is more than 1023 (No of S1014), the transmitting apparatus 110 aborts this authentication sequence.

In addition, when the round trip time ($RTT_W$−$RTT_L$) is equal to or less than the threshold value $D_W$ (Yes of S1015), the transmitting apparatus 110 further checks whether the message authentication code MAC2B received by ACCEPTED(MAC2B).RSP is matched with MAC2A generated by the transmitting apparatus 110 (S1016). When the message authentication code MAC2B is not matched with MAC2A (No of S1016), the transmitting apparatus 110 aborts this authentication sequence.

When the message authentication codes MAC2A and MAC2B are matched with each other (Yes of S1016), the transmitting apparatus 110 transmits an RTT verification command RTT_VERIFY.CMD (C1010). In response to the command, the receiving apparatus 130 checks whether the message authentication code MAC1A received by RTT_TEST(MAC1A).CMD is matched with MAC1B generated by the receiving apparatus 130 (S1032). When the message authentication code MAC1A is not matched with MAC1B (No of S1032), the receiving apparatus 130 aborts this authentication sequence. When the message authentication code MAC1A is matched with MAC1B (Yes of S1032), the receiving apparatus 130 returns ACCEPTED(OKMSG). RSP (C1011).

If the transmitting apparatus 110 receives ACCEPTED (OKMSG).RSP from the receiving apparatus 130, the transmitting apparatus 110 verifies a message OKMSG included in ACCEPTED(OKMSG).RSP (S1017). If the transmitting apparatus 110 succeeds in verification of the message OKMSG (Yes of S1017), the transmitting apparatus 110 adds the receiving apparatus 130 to an RTT registry and sets a content transmission counter to 40 hours (S1018). If the transmitting apparatus 110 fails in verification of the message OKMSG (No of S1017), the transmitting apparatus 110 aborts this authentication sequence.

When a TTL field of an IP header of a received packet has a value more than 3, the receiving apparatus 130 corresponding to DTCP-IP discards an IP datagram thereof. Therefore, in a communication sequence illustrated in FIGS. 10A and 10B, the relay apparatus 120 may set 3 to be the prescribed number of hops to the TTL field of the IP header at all times, when transmitting the TTL field to the receiving apparatus 130 (similar to the above case).

As described above, in the communication system 100 that includes the transmitting apparatus 110, the receiving apparatus 130, and the relay apparatus 120, content can be distributed from a distribution server outside the home to the receiving apparatus 130 such as the existing TV corresponding to DLNA and DTCP-IP. In addition, the limit of the round trip time applied between the Source and the Sink in the current DTCP-IP can be applied to the transmission between the relay apparatus 120 and the receiving apparatus 130 and unjust use (redistribution through the Internet) of the content can be prevented.

In addition, the technique disclosed in the present specification may take the following configurations.

(1) A communication apparatus including:

a data accumulating unit that accumulates transmission data;

a communication unit that performs communication with a receiving apparatus becoming a transmission destination of data and a relay apparatus performing relay with the receiving apparatus;

a first round trip time information acquiring unit that acquires first round trip time information regarding a first round trip time $RTT_L$ between the relay apparatus and the receiving apparatus;

an authentication and key exchanging unit that performs authentication and key exchange with the receiving apparatus through the relay apparatus, under a condition of the key exchange where the first round trip time $RTT_L$ is equal to or less than a first threshold value; and a data transmitting unit that transmits data encrypted using a key exchanged by the authentication and key exchanging unit to the receiving apparatus.

(2) The communication apparatus according to (1), wherein the first round trip time information acquiring unit acquires information of the first round trip time $RTT_L$ from the relay apparatus.

(3) The communication apparatus according to (2), wherein the first round trip time information includes transmission timing T1 at which the relay apparatus has transmitted a command for round trip time measurement transmitted from the communication apparatus to the receiving apparatus and reception timing T2 at which the relay apparatus has received a response thereof from the receiving apparatus, and the authentication and key exchanging unit performs the authentication and key exchange with the receiving apparatus through the relay apparatus, under a condition of the key exchange where the first round trip time $RTT_L$ (=T2−T1) based on a difference of the received transmission timing and reception timing is equal to or less than the first threshold value.

(4) The communication apparatus according to (2), wherein the first round trip time information is the first round trip time $RTT_L$ (=T2−T1) based on a difference of transmission timing T1 at which the relay apparatus has transmitted a command for round trip time measurement transmitted from the communication apparatus to the receiving apparatus and reception timing T2 at which the relay apparatus has received a response thereof, and the authentication and key exchanging unit performs the authentication and key exchange with the receiving apparatus through the relay apparatus, under a condition of the key exchange where the received round trip time $RTT_L$ is equal to or less than the first threshold value.

(5) The communication apparatus according to any one of (1) to (4), wherein the first round trip time information acquiring unit receives information for falsification prevention from the relay apparatus, and the authentication and key exchanging unit detects falsification of the first round trip time information on the basis of the information for the falsification prevention and sets non-falsification as a condition of the key exchange.

(6) The communication apparatus according to (3) or (4), further including:

a measuring unit that measures a second round trip time $RTT_W$ until a response from the receiving apparatus is received through the relay apparatus after the command for the round trip time measurement is transmitted, wherein the authentication and key exchanging unit sets a result obtained by subtracting the first round trip time $RTT_L$ from the second round trip time $RTT_W$ being equal to or less than a second threshold value as the condition of the key exchange.

(7) The communication apparatus according to any one of (1) to (6), wherein the communication apparatus and the relay apparatus are connected by a WAN and the relay apparatus and the receiving apparatus are connected by a LAN.

(8) The communication apparatus according to (6), wherein the second threshold value is a value that is determined on the basis of a distance of a channel connecting the communication apparatus and the relay apparatus.

(9) A communication apparatus including:

a first communication unit that performs communication with a transmitting apparatus becoming a transmission origin of data by a first network;

a second communication unit that performs communication with a receiving apparatus becoming a transmission destination of data by a second network; and a round trip time information acquiring unit that acquires round trip time information regarding a round trip time $RTT_L$ with the receiving apparatus on the second network and transmits the round trip time information to the transmitting apparatus.

(10) The communication apparatus according to (9), wherein the round trip time information acquiring unit acquires transmission timing T1 at which a command for round trip time measurement transmitted from the transmitting apparatus has been transmitted to the receiving apparatus and reception timing T2 at which a response thereof has been received from the receiving apparatus as the round trip time information and transmits the transmission timing and the reception timing to the transmitting apparatus.

(11) The communication apparatus according to (9), wherein the round trip time information acquiring unit acquires the round trip time $RTT_L$ (=T2−T1) based on a difference of transmission timing T1 at which a command for round trip time measurement transmitted from the transmitting apparatus has been transmitted to the receiving apparatus and reception timing T2 at which a response thereof has been received from the receiving apparatus as the round trip time information and transmits the round trip time to the transmitting apparatus.

(12) The communication apparatus according to any one of (9) to (11), wherein the round trip time information acquiring unit adds information for falsification prevention and transmits the round trip time information to the transmitting apparatus.

(13) The communication apparatus according to any one of (9) to (12), wherein, when the second communication unit transmits a command or a response from the transmitting apparatus to the receiving apparatus, the second communication unit sets a value of a prescribed hop number to a field of a header, the field describing a restriction hop number and transmits the command or the response.

(14) The communication apparatus according to any one of (9) to (13), wherein the first network is a WAN and the second network is a LAN.

(15) A communication method including:

a first round trip time information acquiring step of acquiring first round trip time information regarding a first round trip time $RTT_L$ between a receiving apparatus becoming a transmission destination of data and a relay apparatus performing relay with the receiving apparatus;

an authentication and key exchanging step of performing authentication and key exchange with the receiving apparatus through the relay apparatus, under a condition of the key exchange where the first round trip time $RTT_L$ is equal to or less than a first threshold value; and a data transmitting step of transmitting data encrypted using a key exchanged in the authentication and key exchanging step to the receiving apparatus.

(16) A communication method including:
  a first communication step of performing communication with a transmitting apparatus becoming a transmission origin of data by a first network;
  a second communication unit performing communication with a receiving apparatus becoming a transmission destination of data by a second network; and
  a round trip time information acquiring step of acquiring round trip time information regarding a round trip time $RTT_L$ with the receiving apparatus on the second network and transmitting the round trip time information to the transmitting apparatus.

(17) A communication system including:
  a transmitting apparatus that transmits data; and
  a relay apparatus that performs communication with the transmitting apparatus by a first network and performs communication with a receiving apparatus becoming a transmission destination of data by a second network,
  where the relay apparatus acquires first round trip time information regarding a round trip time $RTT_L$ with the receiving apparatus on the second network and transmits the first round trip time information to the transmitting apparatus, and
  the transmitting apparatus performs authentication and key exchange with the receiving apparatus through the relay apparatus, under a condition of the key exchange where the first round trip time $RTT_L$ is equal to or less than a first threshold value, and transmits data encrypted using the exchanged key to the receiving apparatus.

(18) The communication system according to (17),
  wherein the relay apparatus acquires transmission timing T1 at which a command for round trip time measurement transmitted from the transmitting apparatus has been transmitted to the receiving apparatus and reception timing T2 at which a response thereof has been received from the receiving apparatus as the first round trip time information and transmits the transmission timing and the reception timing to the transmitting apparatus, and
  the transmitting apparatus performs the authentication and key exchange with the receiving apparatus through the relay apparatus, under a condition of the key exchange where the first round trip time $RTT_L$ (=T2−T1) based on a difference of the received transmission timing and reception timing is equal to or less than the first threshold value.

(19) The communication system according to (17),
  wherein the relay apparatus acquires the first round trip time $RTT_L$ (=T2−T1) based on a difference of transmission timing T1 at which a command for round trip time measurement transmitted from the transmitting apparatus has been transmitted to the receiving apparatus and reception timing T2 at which a response thereof has been received from the receiving apparatus as the first round trip time information and transmits the transmission timing and the reception timing to the transmitting apparatus as the round trip time information and transmits the transmission timing and the reception timing to the transmitting apparatus, and
  the transmitting apparatus performs the authentication and key exchange with the receiving apparatus through the relay apparatus, under a condition of the key exchange where the received first round trip time $RTT_L$ is equal to or less than the first threshold value.

(20) The communication system according to any one of (17) to (19),
  wherein the relay apparatus adds information for falsification prevention and transmits the round trip time information to the transmitting apparatus, and
  the transmitting apparatus detects falsification of the first round trip time information on the basis of the information for the falsification prevention and sets non-falsification as the condition of the key exchange.

(21) The communication system according to any one of (17) to (20),
  wherein the transmitting apparatus measures a second round trip time $RTT_W$ until a response from the receiving apparatus is received through the relay apparatus after the command for the round trip time measurement is transmitted and sets a result obtained by subtracting the first round trip time $RTT_L$ from the second round trip time $RTT_W$ being equal to or less than a second threshold value as the condition of the key exchange.

(22) The communication system according to any one of (17) to (21),
  wherein, when the relay apparatus transmits a command or a response from the transmitting apparatus to the receiving apparatus, the relay apparatus sets a value of a prescribed hop number to a field of a header, the field describing a restriction hop number and transmits the command or the response.

(23) The communication system according to any one of (17) to (22),
  wherein the first network is a WAN and the second network is a LAN.

(24) The communication system according to (21),
  wherein the second threshold value is a value that is determined on the basis of a distance of a channel connecting the communication apparatus and the relay apparatus.

(25) A computer program that is described with a computer readable format to cause a computer to function as:
  a data accumulating unit that accumulates transmission data;
  a communication unit that performs communication with a receiving apparatus becoming a transmission destination of data and a relay apparatus performing relay with the receiving apparatus;
  a first round trip time information acquiring unit that acquires first round trip time information regarding a first round trip time $RTT_L$ between the relay apparatus and the receiving apparatus;
  an authentication and key exchanging unit that performs authentication and key exchange with the receiving apparatus through the relay apparatus, under a condition of the key exchange where the first round trip time $RTT_L$ is equal to or less than a first threshold value; and
  a data transmitting unit that transmits data encrypted using a key exchanged by the authentication and key exchanging unit to the receiving apparatus.

(26) A computer program that is described with a computer readable format to cause a computer to function as:
  a first communication unit that performs communication with a transmitting apparatus becoming a transmission origin of data by a first network;
  a second communication unit that performs communication with a receiving apparatus becoming a transmission destination of data by a second network; and
  a round trip time information acquiring unit that acquires round trip time information regarding a round trip time $RTT_L$ with the receiving apparatus on the second network and transmits the round trip time information to the transmitting apparatus.

INDUSTRIAL APPLICABILITY

The technique disclosed in the present specification has been described in detail with reference to the specific embodiments. However, it should be understood by those skilled in the art that various modifications and alterations of the embodiments may be made without departing from the scope of the technique disclosed in the present specification.

In the present specification, the description has been given on the basis of the embodiment in which the content distribution service is performed from the transmitting apparatus such as the content distribution server disposed outside the home to the receiving apparatus in the home, through the relay apparatus such as the modem. However, the scope of the technique disclosed in the present specification is not limited thereto.

In short, because the present technique is disclosed in an exemplary form, it should be noted that content described in the present specification is not analyzed to be limited. In order to determine the scope of the present technique, claims should be considered.

REFERENCE SIGNS LIST

100 . . . Communication system
110 . . . Transmitting apparatus
111 . . . CPU
112 . . . Data accumulating unit
113 . . . Memory
114 . . . WAN interface
115 . . . Timer
120 . . . Relay apparatus
121 . . . CPU
122 . . . Timer
123 . . . WAN interface
124 . . . Memory
125 . . . LAN interface
130 . . . Receiving apparatus
131 . . . CPU
132 . . . LAN interface
133 . . . Memory
134 . . . Output unit
140 . . . WAN
150 . . . LAN (home network)

The invention claimed is:

1. A communication apparatus comprising:
a data accumulating unit that accumulates transmission data;
a communication unit that performs communication with a receiving apparatus becoming a transmission destination of data and a relay apparatus performing relay with the receiving apparatus;
a first round trip time information acquiring unit that acquires first round trip time information regarding a first round trip time $RTT_L$ between the relay apparatus and the receiving apparatus;
an authentication and key exchanging unit that performs authentication and key exchange with the receiving apparatus through the relay apparatus, under a condition of the key exchange where the first round trip time $RTT_L$ is equal to or less than a first threshold value;
a data transmitting unit that transmits data encrypted using a key exchanged by the authentication and key exchanging unit to the receiving apparatus;
wherein the first round trip time information acquiring unit acquires information of the first round trip time $RTT_L$ from the relay apparatus; and
wherein the first round trip time information includes transmission timing T1 at which the relay apparatus has transmitted a command for round trip time measurement transmitted from the communication apparatus to the receiving apparatus and reception timing T2 at which the relay apparatus has received a response thereof from the receiving apparatus, and the authentication and key exchanging unit performs the authentication and key exchange with the receiving apparatus through the relay apparatus, under a condition of the key exchange where the first round trip time $RTT_L$ (=T2−T1) based on a difference of the received transmission timing and reception timing is equal to or less than the first threshold value.

2. The communication apparatus according to claim 1, wherein the first round trip time information is the first round trip time $RTT_L$ (=T2−T1) based on a difference of transmission timing T1 at which the relay apparatus has transmitted a command for round trip time measurement transmitted from the communication apparatus to the receiving apparatus and reception timing T2 at which the relay apparatus has received a response thereof, and the authentication and key exchanging unit performs the authentication and key exchange with the receiving apparatus through the relay apparatus, under a condition of the key exchange where the received round trip time $RTT_L$ is equal to or less than the first threshold value.

3. The communication apparatus according to claim 1, wherein the first round trip time information acquiring unit receives information for falsification prevention from the relay apparatus, and the authentication and key exchanging unit detects falsification of the first round trip time information on the basis of the information for the falsification prevention and sets non-falsification as a condition of the key exchange.

4. The communication apparatus according to claim 1, further comprising: a measuring unit that measures a second round trip time $RTT_W$ until a response from the receiving apparatus is received through the relay apparatus after the command for the round trip time measurement is transmitted, wherein the authentication and key exchanging unit sets a result obtained by subtracting the first round trip time $RTT_L$ from the second round trip time $RTT_W$ being equal to or less than a second threshold value as the condition of the key exchange.

5. The communication apparatus according to claim 1, wherein the communication apparatus and the relay apparatus are connected by a WAN and the relay apparatus and the receiving apparatus are connected by a LAN.

6. The communication apparatus according to claim 4, wherein the second threshold value is a value that is determined on the basis of a distance of a channel connecting the communication apparatus and the relay apparatus.

7. A communication method comprising:
a first round trip time information acquiring step of acquiring first round trip time information regarding a first round trip time $RTT_L$ between a receiving apparatus becoming a transmission destination of data and a relay apparatus performing relay with the receiving apparatus;
an authentication and key exchanging step of performing authentication and key exchange with the receiving apparatus through the relay apparatus, under a condition of the key exchange where the first round trip time $RTT_L$ is equal to or less than a first threshold value;
a data transmitting step of transmitting data encrypted using a key exchanged in the authentication and key exchanging step to the receiving apparatus;
wherein the first round trip time information acquiring unit acquires information of the first round time $RTT_L$ from the relay apparatus; and wherein the first round trip time information includes transmission timing T1 at which the relay apparatus has transmitted a command for round trip time measurement transmitted from the communication apparatus to the receiving apparatus and reception timing T2 at which the relay apparatus has received a response thereof from the receiving apparatus, and the authentication and key exchanging unit performs the authentication and key exchange with the receiving apparatus through the relay apparatus, under a condition of the key exchange where the first round trip time $RTT_L$ (=T2−T1) based on a difference of the received transmission timing and reception timing is equal to or less than the first threshold value.

8. A communication system comprising:

a transmitting apparatus that transmits data; and a relay apparatus that performs communication with the transmitting apparatus by a first network and performs communication with a receiving apparatus becoming a transmission destination of data by a second network, where the relay apparatus acquires first round trip time information regarding a round trip time $RTT_L$ with the receiving apparatus on the second network and transmits the first round trip time information to the transmitting apparatus, and the transmitting apparatus performs authentication and key exchange with the receiving apparatus through the relay apparatus, under a condition of the key exchange where the first round trip time $RTT_L$ is equal to or less than a first threshold value, and transmits data encrypted using the exchanged key to the receiving apparatus;

wherein the relay apparatus acquires transmission timing T1 at which a command for round trip time measurement transmitted from the transmitting apparatus has been transmitted to the receiving apparatus and reception timing T2 at which a response thereof has been received from the receiving apparatus as the first round trip time information and transmits the transmission timing and the reception timing to the transmitting apparatus, and the transmitting apparatus performs the authentication and key exchange with the receiving apparatus through the relay apparatus, under a condition of the key exchange where the first round trip time $RTT_L$ (=T2−T1) based on a difference of the received transmission timing and reception timing is equal to or less than the first threshold value.

9. The communication system according to claim 8, wherein the relay apparatus acquires the first round trip time $RTT_L$ (=T2−T1) based on a difference of transmission timing T1 at which a command for round trip time measurement transmitted from the transmitting apparatus has been transmitted to the receiving apparatus and reception timing T2 at which a response thereof has been received from the receiving apparatus as the first round trip time information and transmits the transmission timing and the reception timing to the transmitting apparatus as the round trip time information and transmits the transmission timing and the reception timing to the transmitting apparatus, and the transmitting apparatus performs the authentication and key exchange with the receiving apparatus through the relay apparatus, under a condition of the key exchange where the received first round trip time $RTT_L$ is equal to or less than the first threshold value.

10. The communication system according to claim 8, wherein the relay apparatus adds information for falsification prevention and transmits the round trip time information to the transmitting apparatus, and the transmitting apparatus detects falsification of the first round trip time information on the basis of the information for the falsification prevention and sets non-falsification as the condition of the key exchange.

11. The communication system according to claim 8, wherein the transmitting apparatus measures a second round trip time $RTT_W$ until a response from the receiving apparatus is received through the relay apparatus after the command for the round trip time measurement is transmitted and sets a result obtained by subtracting the first round trip time $RTT_L$ from the second round trip time $RTT_W$ being equal to or less than a second threshold value as the condition of the key exchange.

12. The communication system according to claim 8, wherein, when the relay apparatus transmits a command or a response from the transmitting apparatus to the receiving apparatus, the relay apparatus sets a value of a prescribed hop number to a field of a header, the field describing a restriction hop number and transmits the command or the response.

13. The communication system according to claim 8, wherein the first network is a WAN and the second network is a LAN.

14. The communication system according to claim 11, wherein the second threshold value is a value that is determined on the basis of a distance of a channel connecting the communication apparatus and the relay apparatus.

15. A non-transitory computer readable medium including a computer program that is described with a computer readable format to cause a computer to function as:

a data accumulating unit that accumulates transmission data;

a communication unit that performs communication with a receiving apparatus becoming a transmission destination of data and a relay apparatus performing relay with the receiving apparatus;

a first round trip time information acquiring unit that acquires first round trip time information regarding a first round trip time $RTT_L$ between the relay apparatus and the receiving apparatus;

an authentication and key exchanging unit that performs authentication and key exchange with the receiving apparatus through the relay apparatus, under a condition of the key exchange where the first round trip time $RTT_L$ is equal to or less than a first threshold value;

a data transmitting unit that transmits data encrypted using a key exchanged by the authentication and key exchanging unit to the receiving apparatus;

wherein the first round trip time information acquiring unit acquires information of the first round tip time $RTT_L$ from the relay apparatus; and wherein the first round trip time information includes transmission timing T1 at which the relay apparatus has transmitted a command for round trip time measurement transmitted from the communication apparatus to the receiving apparatus and reception timing T2 at which the relay apparatus has received a response thereof from the receiving apparatus, and the authentication and key exchanging unit performs the authentication and key exchange with the receiving apparatus through the relay apparatus, under a condition of the key exchange where the first round trip time $RTT_L$ (=T2−T1) based on a difference of the received transmission timing and reception timing is equal to or less than the first threshold value.

* * * * *